(12) United States Patent
Patchornik

(10) Patent No.: US 12,454,567 B2
(45) Date of Patent: Oct. 28, 2025

(54) LARGE SCALE PURIFICATION OF ANTIBODIES

(71) Applicant: Ariel Scientific Innovations Ltd., Ariel (IL)

(72) Inventor: Guy Patchornik, Kiryat-Ono (IL)

(73) Assignee: Ariel Scientific Innovations Ltd., Ariel (IL)

( * ) Notice: Subject to any disclaimer, the term of this patent is extended or adjusted under 35 U.S.C. 154(b) by 0 days.

(21) Appl. No.: 18/291,954

(22) PCT Filed: Jul. 27, 2022

(86) PCT No.: PCT/IL2022/050818
§ 371 (c)(1),
(2) Date: Jan. 25, 2024

(87) PCT Pub. No.: WO2023/007497
PCT Pub. Date: Feb. 2, 2023

(65) Prior Publication Data
US 2024/0262890 A1    Aug. 8, 2024

Related U.S. Application Data

(60) Provisional application No. 63/225,994, filed on Jul. 27, 2021.

(51) Int. Cl.
*C07K 16/06* (2006.01)
*C07K 1/32* (2006.01)

(52) U.S. Cl.
CPC ............. *C07K 16/065* (2013.01); *C07K 1/32* (2013.01)

(58) Field of Classification Search
CPC .................................................. C07K 16/065
See application file for complete search history.

(56) References Cited

U.S. PATENT DOCUMENTS

| | | |
|---|---|---|
| 9,332,779 B2 | 5/2016 | Marga |
| 9,700,067 B2 | 7/2017 | Fraser et al. |
| 2006/0121006 A1 | 6/2006 | Chancellor et al. |
| 2011/0301249 A1 | 12/2011 | Challakere |
| 2012/0053328 A1 | 3/2012 | Yan et al. |
| 2016/0115195 A1 | 4/2016 | Mendiratta et al. |
| 2017/0121668 A1 | 5/2017 | Sheves et al. |
| 2020/0100525 A1 | 4/2020 | Savir et al. |
| 2020/0102372 A1 | 4/2020 | Patchornik et al. |
| 2024/0140988 A1 | 5/2024 | Patchornik et al. |

FOREIGN PATENT DOCUMENTS

| | | |
|---|---|---|
| CN | 1563090 | 1/2005 |
| CN | 102301235 | 12/2011 |
| WO | WO 2006/041429 | 4/2006 |
| WO | WO 2013/010042 | 1/2013 |
| WO | WO 2013/016547 | 1/2013 |
| WO | WO 2015/161099 | 10/2015 |
| WO | WO 2018/189738 | 10/2018 |
| WO | WO 2018/207184 | 11/2018 |
| WO | WO 2018/207184 A3 | 11/2018 |
| WO | WO 2021/033176 | 2/2021 |

OTHER PUBLICATIONS

Ex Parte Quayle Official Action Dated Jan. 19, 2024 From the US Patent and Trademark Office Re. U.S. Appl. No. 16/611,859. (4 Pages).
Translation Dated Feb. 22, 2023 Decision on Rejection Dated Feb. 2, 2024 From the State Intellectual Property Office of the People's Republic of China Re. Application No. 201880045994.5. (8 Pages).
Notice of Allowance Dated Mar. 18, 2024 from the US Patent and Trademark Office Re. U.S. Appl. No. 16/611,859. (4 pages).
Communication Pursuant to Article 94(3) EPC Dated Sep. 6, 2021 From the European Patent Office Re. Application No. 18732163.3. (8 Pages).
Corrected International Search Report and the Written Opinion Dated Jun. 29, 2018 From the International Searching Authority Re. Application No. PCT/IL2018/050398. (15 Pages).
English Translation Dated May 20, 2022 of Notice of Reasons for Rejection Dated May 10, 2022 From the Japan Patent Office Re. Application No. 2019-561788. (4 Pages).
International Preliminary Report on Patentability Dated Mar. 3, 2022 From the International Bureau of WIPO Re. Application No. PCT/IL2020/050452. (14 Pages).
International Preliminary Report on Patentability Dated Nov. 21, 2019 From the International Bureau of WIPO Re. Application No. PCT/IL2018/050506. (9 Pages).
International Preliminary Report on Patentability Dated Oct. 24, 2019 From the International Bureau of WIPO Re. Application No. PCT/IL2018/050398. (10 Pages).
International Search Report and the Written Opinion Dated Nov. 12, 2018 From the International Searching Authority Re. Application No. PCT/IL2018/050506. (16 Pages).
International Search Report and the Written Opinion Dated Oct. 19, 2020 From the International Searching Authority Re. Application No. PCT/IL2020/050452. (22 Pages).
International Search Report and the Written Opinion Dated Sep. 22, 2022 From the International Searching Authority Re. Application No. PCT/IL2022/050818. (19 Pages).
International Search Report and the Written Opinion Dated Jun. 29, 2018 From the International Searching Authority Re. Application No. PCT/IL2018/050398. (15 Pages).
Invitation to Pay Additional Fees, Communication Relating to the Results of the Partial International Search and the Provisional Opinion Dated Jul. 20, 2020 From the International Searching Authority Re. Application No. PCT/IL2020/050452. (17 Pages).

(Continued)

*Primary Examiner* — Suzanne M Noakes

(57) ABSTRACT

A method of isolating an antibody is disclosed. The method comprises contacting an aggregate comprising a hydrophobic chelator, at least one non-ionic detergent, metal ions and a non-detergent hydrophobic agent with a liquid sample comprising the antibody under conditions that allow partitioning of the antibody into the aggregate, thereby isolating the antibody. Kits for isolating antibodies are also disclosed.

12 Claims, 21 Drawing Sheets

(56) References Cited

OTHER PUBLICATIONS

Notice of Reason(s) for Rejection Dated Feb. 1, 2023 From the Japan Patent Office Re. Application No. 2019-561788. (3 pages).
Notice of Reason(s) for Rejection Dated Aug. 22, 2023 From the Japan Patent Office Re. Application No. 2019-561788 and Its Translation Into English. (5 Pages).
Notice of Reasons for Rejection Dated May 10, 2022 From the Japan Patent Office Re. Application No. 2019-561788. (5 Pages).
Notification of Office Action and Search Report Dated Sep. 13, 2022 From the State Intellectual Property Office of the People's Republic of China Re. Application No. 201880045994.5 and Its Translation of Office Action Into English. (17 Pages).
Notification of Office Action Dated Sep. 26, 2023 From the National Intellectual Property Administration of the People's Republic of China Re. Application No. 201880045994.5 and Its Translation Into English. (10 Pages).
Office Action Dated Sep. 22, 2022 From the Israel Patent Office Re. Application No. 268878. (4 Pages).
Official Action Dated Jul. 5, 2023 from the US Patent and Trademark Office Re. U.S. Appl. No. 16/611,859. (20 pages).
Official Action Dated Dec. 22, 2022 from the US Patent and Trademark Office Re. U.S. Appl. No. 16/611,859. (29 pages).
Restriction Official Action Dated Oct. 3, 2022 from US Patent and Trademark Office Re. U.S. Appl. No. 16/611,859. (9 pages).
Translation Dated Apr. 11, 2023 of Grounds of Reason of Rejection Dated Mar. 20, 2023 From the Korean Intellectual Property Office Re. Application No. 10-2019-7036438. (7 Pages).
Translation Dated Feb. 15, 2023 of Notice of Reason(s) for Rejection Dated Feb. 1, 2023 From the Japan Patent Office Re. Application No. 2019-561788. (3 pages).
Dhandapani et al. "A General Platform for Antibody Purification Utilizing Engineered-Micelles", mABS, XP055711155, 11(3): 583-592, Published Online Feb. 6, 2019.
Dhandapani et al. "Conjugated Detergent Micelles as a Platform for IgM Purification", Biotechnology and Bioengineering, 119(7): 1997-2003, Mar. 24, 2022.
Dhandapani et al. "Detergent Micelle Conjugates Containing Amino Acid Monomers Allow Purification of Human IgG Near Neutral pH", Journal of Chromatography B, 1206: 1-5, Jun. 28, 2022.
Dhandapani et al. "Nonionic Detergent Micelle Aggregates: An Economical Alternative to Protein A Chromatography", New Biotechnology, 61: 90-98, Dec. 3, 2021.
Dhandapani et al. "Purification of Antibody Fragments via Interaction with Detergent Micellar Aggregates", Scientific Reports, 11: 11697, Jun. 3, 2011.
Dhandapani et al. "Purification of Antibody Fragments via Interaction with Detergent Micellar Aggregates", Scientific Reports, 11: 1-11, Jun. 3, 2021.
Dhandapani et al. "Role of Amphiphilic [Metal:Chelator] Complexes in A Non-Chromatographic Antibody Purification Platform", Journal of Chromatography B: Biomedical Sciences & Applications, XP085922155, 1133: 121830-1-121830-10, Available Online Oct. 21, 2019.
Dutta et al. "Engineered-Membranes and Engineered-Micelles as Efficient Tools for Purification of Halorhodopsin and Bacteriorhodopsin", Analyst, 140: 204-212, Nov. 3, 2014.
Follman et al. "Factorial Screening of Antibody Purification Processes Using Three Chromatography Steps Without Protein A", Journal of Chromatography A, 1024(1): 79-85, Jan. 23, 2004.
Frenzel et al. "Expression of Recombinant Antibodies", Frontiers in Immunology, 4(Art.217): 1-20, Jul. 29, 2013.
Ghosh et al. "Purification of Humanized Monoclonal Antibody by Hydrophobic Interaction Membrane Chromatography", Journal of Chromatography A, 1107(1-2): 104-109, Available Online Jan. 18, 2006.
Guse et al. "Purification and Analytical Characterization of an Anti-CD4 Monoclonal Antibody for Human Therapy", Journal of Chromatography A, 661(1): 13-23, Feb. 11, 1994.
Kumar et al. "Purification of Histidine-Tagged Single-Chain Fv Antibody Fragments by Metal Chelate Affinity Precipitation Using Thermoresponsive Copolymers", Biotechnology and Bioengineering, XP002783967, 84(4): 494-503, Published Online Sep. 11, 2003. Abstract, p. 495, col. 2, Para 2, p. 496, col. 1, Para 2, col. 2, Para 2, 3.
Liu et al. "Nanoparticle Iron Chelators: A New Therapeutic Approach in Alzheimer Disease and Other Neurologic Disorders Associated with Trace Metal Imbalance", Neuroscience Letters, 406(9): 189-193, Oct. 9, 2006.
Manzke et al. "Single-Step Purification of Bispecific Monoclonal Antibodies for Immunotherapeutic Use by Hydrophobic Interaction Chromatography", Journal of Immunological Methods, 208(1): 65-73, Oct. 13, 1997.
McDonald et al. "Selective Antibody Precipitation Using Polyelectrolytes: A Novel Approach to the Purification of Monoclonal Antibodies", Biotechnology and Bioengineering, XP003026475, 102(4): 1141-1151, Published Online Sep. 19, 2008. p. 1144, col. 2, Para 3-p. 1146.
Missirlis et al. "Mechanisms of Peptide Amphiphile Internalization by SJSA-1 Cells in Vitro", Biochemistry, 48: 3304-3314, 2009.
Patchornik et al. "Purification of A Membrane Protein With Conjugated Engineered Micelles", Bioconjugate Chemistry, 24(7): 1270-1275, Jun. 13, 2013.
International Preliminary Report on Patentability Dated Feb. 8, 2024 From the International Bureau of WIPO Re. Application No. PCT/IL2022/050818 (12 Pages).
Office Action Dated Jul. 22, 2024 From the Israel Patent Office Re. Application No. 310409. (4 Pages).
Communication Pursuant to Article 94(3) EPC Dated Dec. 5, 2024 From the European Patent Office Re. Application No. 18732163.3. (6 Pages).
Office Action Dated Jan. 2, 2025 From the Israel Patent Office Re. Application No. 310409. (4 Pages).
Communication Pursuant to Article 94(3) EPC Dated May 27, 2025 From the European Patent Office Re. Application No. 18732163.3 (4 Pages).
Restriction Official Action Dated May 6, 2025 from US Patent and Trademark Office Re. U.S. Appl. No. 17/637,098. (8 pages).
Supplementary European Search Report and the European Search Opinion Dated May 12, 2025 From the European Patent Office Re. Application No. 22848832.6. (14 Pages).

A. Effect of pH

B. Effect of Tyr concentration

C. Effect of DDM concentration

LARGE SCALE PURIFICATION OF ANTIBODIES

RELATED APPLICATIONS

This application claims is a National Phase of PCT Patent Application No. PCT/IL2022/050818 having International filing date of Jul. 27, 2022, which claims the benefit of priority under 35 USC § 119 (e) of U.S. Patent Application No. 63/225,994 filed on 27 Jul. 2021. The contents of the above applications are all incorporated by reference as if fully set forth herein in their entirety.

FIELD AND BACKGROUND OF THE INVENTION

The present invention, in some embodiments thereof, relates to methods and, kits for purifying antibodies.

Monoclonal antibodies (mAb's) are currently the recombinant proteins most commonly used as therapeutics; they were the largest selling class of biologics in the USA in 2012. The dramatic increase in their expression levels from low milligram to multi-gram concentration per liter, together with the multi-hundred kilogram to ton quantities in which some of them will be required, pose an on-going challenge for industrial purification methods capable of efficiently capturing mAb's from complex mixtures. This is generally achieved via ProA chromatography as the initial capturing step, commonly resulting in high recovery yields (~95%), purity (>95%), while removing the majority of host DNA, viral contaminants and leached ProA.

These remarkable features have made ProA chromatography the gold standard for antibody manufacturing. However, there is motivation for the development of more economic alternatives since ProA resins suffer from high costs relative to non-affinity polymeric supports (e.g. ion exchangers). This motivation is further justified when considering the current and future global biotech demands (i.e. many tons of purified mAb's per year) representing hundreds of different therapeutic mAb's under development, all aimed at targeting various cancers, autoimmune and inflammatory disorders.

It has been argued that, the use of ProA, and of chromatographic strategies in general, represent an inherent "productivity bottleneck" for industrial purification of mAb's, which can account for up to 80% of the total manufacturing cost thus making any antibody capturing method not entailing: (a) ProA as a ligand and/or (b) chromatography as the primary capturing step, an attractive alternative for future pharmaceutical needs.

Background art includes Patchornick et al., Bioconjugate Chemistry, 2013, Volume 24, pages 1270-1275; Guse et al., J. Chromatogr A. (1994) 661, 13-23; Manske et al., J. Immunol Methods (1997) 2008, 65-73; Follman and Fahrner J. Chromatogr A. (2004) 1024, 79-85; Dhandapani et al (2019): DOI: 10.1080/19420862.2019.1565749 and Ghosh and Wang, J. Chromatogr A. (2006) 1107, 104-109.

Additional background art includes WO2018/207184 and WO2021/033176.

SUMMARY OF THE INVENTION

According to an aspect of the present invention there is provided a method of isolating an antibody, the method comprising contacting an aggregate comprising a hydrophobic chelator, at least one non-ionic detergent, metal ions and a non-detergent hydrophobic agent with a liquid sample comprising the antibody under conditions that allow partitioning of the antibody into the aggregate, thereby isolating the antibody.

According to an aspect of the present invention there is provided a method of isolating an antibody, the method comprising contacting an aggregate comprising a hydrophobic chelator which has been solubilized in a non-volatile, water miscible organic solvent, at least one non-ionic detergent and metal ions with a liquid sample comprising the antibody under conditions that allow partitioning of the antibody into the aggregate, thereby isolating the antibody.

According to an aspect of the present invention there is provided a kit comprising a hydrophobic chelator, a metal salt and at least two non-ionic detergents, wherein a first of the at least two non-ionic detergents comprises polysorbate 20 or BRIJ-O20™, a second of the at least two non-ionic detergents comprises DDM.

According to an aspect of the present invention there is provided a kit comprising a hydrophobic chelator, a non-detergent, hydrophobic agent, a metal salt and at least one non-ionic detergent.

According to an aspect of the present invention there is provided an antibody preparation obtainable according to the methods described herein.

According to embodiments of the present invention, the generating the aggregate prior to the contacting, wherein the generating comprises combining the hydrophobic chelator, the non-ionic detergent, a metal salt of the metal ions and the non-detergent hydrophobic agent.

According to embodiments of the present invention, the method further comprises solubilizing the hydrophobic chelator in a non-volatile, water-miscible organic solvent to generate a solution of the hydrophic chelator prior to the combining.

According to embodiments of the present invention, the method further comprises:
  (a) solubilizing the hydrophobic chelator in the non-volatile, water-miscible organic solvent to generate a solution of the hydrophobic chelator; and
  (b) combining the solution of hydrophobic chelator with the at least one non-ionic detergent and a metal salt of the metal ions so as to generate the aggregate prior to the contacting.

According to embodiments of the present invention, the non-volatile, water-miscible organic solvent is DMSO or DMS.

According to embodiments of the present invention, the aggregate further comprises a non-detergent hydrophobic agent.

According to embodiments of the present invention, the non-detergent hydrophobic agent is a hydrophobic amino acid or a phospholipid.

According to embodiments of the present invention, the hydrophobic amino acid is phenylalanine (Phe).

According to embodiments of the present invention, the hydrophobic amino acid is selected from the group consisting of Phenylalanine (Phe), Tyrosine (Tyr), Tryptophan (Trp), Isoleucine (Ile) and Valine (Val).

According to embodiments of the present invention, the phosopholipid is phosphatidylinositol or phosphatidylserine.

According to embodiments of the present invention, the at least one non-ionic detergent comprises a polar head group.

According to embodiments of the present invention, the at least one non-ionic detergent comprises at least one sugar moiety.

According to embodiments of the present invention, the at least one non-ionic detergent is octyl glucoside (OG) or dodecyl maltoside (DDM).

According to embodiments of the present invention, the at least one non-ionic detergent comprises a primary amine.

According to embodiments of the present invention, the at least one non-ionic detergent is an alkylamine.

According to embodiments of the present invention, the alkylamine is decyl amine.

According to embodiments of the present invention, the at least one non-ionic detergent is a polysorbate surfactant.

According to embodiments of the present invention, the polysorbate surfactant is selected from the group consisting of polysorbate 20, polysorbate 40, polysorbate 60 and polysorbate 80.

According to embodiments of the present invention, the at least one non-ionic detergent belongs to a family selected from the group consisting of the TWEEN™ family, the BRIJ™ family and the TRITON™ family.

According to embodiments of the present invention, the at least one non-ionic detergent is selected from the group consisting of TWEEN™-60, BRIJ™-S100 and TRITON™-X-100.

According to embodiments of the present invention, the at least one non-ionic detergent comprises at least two non-ionic detergents.

According to embodiments of the present invention, the first of the at least two non-ionic detergents is a polysorbate surfactant and a second of the at least two non-ionic detergents comprises at least one sugar moiety or comprises a primary amine.

According to embodiments of the present invention, the polysorbate surfactant is selected from the group consisting of polysorbate 20, polysorbate 40, polysorbate 60 and polysorbate 80.

According to embodiments of the present invention, the first of the at least two non-ionic detergents comprises polysorbate 20 or BRIJ™-O20, and a second of the at least two non-ionic detergents comprises DDM or octanoic acid.

According to embodiments of the present invention, the at least one non-ionic detergent comprises at least three non-ionic detergents, wherein a first of the at least two non-ionic detergents comprises polysorbate 20 or BRIJ™-O20, a second of the at least two non-ionic detergents comprises DDM and a third of the at least two non-ionic detergents comprises decyl amine.

According to embodiments of the present invention, the first of the at least two non-ionic detergents belongs to a family selected from the group consisting of the TWEEN™ family, the BRIJ™ family and the TRITON™ family and a second of the at least two non-ionic detergents comprises at least one sugar moiety or comprises a primary amine.

According to embodiments of the present invention, the non-ionic detergent is selected from the group consisting of polysorbate-20, Polyoxyethylene (20) oleyl ether (BRIJ™-O20) and TRITON™-X-100.

According to embodiments of the present invention, the metal ions comprise iron ions.

According to embodiments of the present invention, the aggregate has a diameter greater than 500 nM.

According to embodiments of the present invention, the aggregate has a diameter of between 500-3000 nM.

According to embodiments of the present invention, the liquid sample comprises a hybridoma medium.

According to embodiments of the present invention, the liquid sample comprises serum albumin.

According to embodiments of the present invention, the conditions comprise having a level of salt below 100 mM.

According to embodiments of the present invention, the method further comprises solubilizing the antibody following the isolating.

According to embodiments of the present invention, the solubilizing is effected with a buffer having a pH between 3-6.

According to embodiments of the present invention, the solubilizing is effected with a buffer having a pH between 3.8 and 4.

According to embodiments of the present invention, the buffer further comprises a salt.

According to embodiments of the present invention, the buffer is a carboxylic buffer.

According to embodiments of the present invention, the buffer comprises an amino acid.

According to embodiments of the present invention, the carboxylic buffer is selected from the group consisting of isoleucine, valine, glycine and sodium acetate.

According to embodiments of the present invention, the hydrophobic chelator comprises 8-Hydroxyquinoline.

According to embodiments of the present invention, the hydrophobic chelator comprises a phenanthroline.

According to embodiments of the present invention, the phenanthroline is selected from the group consisting of N-(1,10-Phenanthrolin-5-yl)methanamide) (Phen-C1), N-(1,10-Phenanthrolin-5-yl)ethanamide) (Phen-C2), N-(1,10-Phenanthrolin-5-yl)propanamide) (Phen-C3), N-(1,10-Phenanthrolin-5-yl)butanamide) (Phen-C4), N-(1,10-Phenanthrolin-5-yl)pentanamide) (Phen-C5), N-(1,10-Phenanthrolin-5-yl)hexanamide) (Phen-C6), N-(1,10-Phenanthrolin-5-yl)heptanamide) (Phen-C7), N-(1,10-Phenanthrolin-5-yl)octanamide) (Phen-C8), N-(1,10-Phenanthrolin-5-yl)nonanamide) (Phen-C9) and N-(1,10-Phenanthrolin-5-25 yl)decanamide) (Phen-C10).

According to embodiments of the present invention, the phenanthroline is selected from the group consisting of bathophenanthroline, N-(1,10-Phenanthrolin-5-yl)hexanamide) (Phen-6), N-(1,10-Phenanthrolin-5-yl)decanamide) (Phen-C10) and N-(1,10-Phenanthrolin-5-yl)octanamide) (Phen-C8).

According to embodiments of the present invention, the phenanthroline is bathophenanthroline.

According to embodiments of the present invention, the iron salt is selected from the group consisting of iron chloride, iron bromide and iron fluoride.

According to embodiments of the present invention, the hydrophobic chelator is present in the liquid sample at a concentration in the range of about 0.1% to about 10% (v/v).

According to embodiments of the present invention, the antibody is a humanized antibody.

According to embodiments of the present invention, the antibody is a recombinant antibody.

According to embodiments of the present invention, the antibody is selected from the group consisting of IgA, IgD, IgE, IgM and IgG.

According to embodiments of the present invention, the antibody is an IgM.

According to embodiments of the present invention, the kit comprises a third non-ionic detergent.

According to embodiments of the present invention, the third non-ionic detergent is decyl amine.

According to embodiments of the present invention, the metal salt comprises an iron salt.

According to embodiments of the present invention, the iron salt is selected from the group consisting of iron chloride, iron bromide and iron fluoride.

According to embodiments of the present invention, the non-detergent hydrophobic agent is a hydrophobic amino acid or a phospholipid.

According to embodiments of the present invention, the hydrophobic amino acid is phenylalanine (Phe).

According to embodiments of the present invention, the solubilizing is effected at a pH above 6.

According to embodiments of the present invention, the hydrophobic amino acid is selected from the group consisting of Phenylalanine (Phe), Tyrosine (Tyr), Tryptophan (Trp), Isoleucine (Ile) and Valine (Val).

According to embodiments of the present invention, the phosopholipid is phosphatidylinositol or phosphatidylserine.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 19A: Partial purification of albumin from cryo-rich plasma (CRP). Lane 1: Molecular weight markers; lane 2: [C] Control—Total amount (100%) of CRP added to the detergent aggregates; lanes 3-6: Supernatant composition. Four repetitions of the capturing step demonstrating process reproducibility. The gel is Coomassie stained. It can be seen that most of the albumin (~90%, by densitometry) is in the supernatant. FIG. 19B. Extraction of IVIG at pH 6.5. Lane 1: Molecular weight markers; lanes 2 and 7: [C] Control—Total amount (100%) of cryo-rich plasma (CRP) added to the detergent aggregates; lanes 3-4: Extracted IVIG at 32° C.; lanes 5-6: Extracted IVIG at 25° C. The gel is Coomassie stained. It can be seen that most of the IVIG (~85%, by densitometry) is in the supernatant.

DESCRIPTION OF SPECIFIC EMBODIMENTS OF THE INVENTION

The present invention, in some embodiments thereof, relates to methods and, kits for purifying antibodies. In particular, the methods relate to a method of antibody capturing without the use of the common ligand, Protein A (ProA).

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

Purification of antibodies typically uses Protein A (proA) chromatography as the initial capturing step. However, proA chromatography is very expensive creating a "productivity bottleneck".

The present inventors previously uncovered a method for purifying antibodies based on the use of hydrophobic chelators, non-ionic detergents and metal ions (see WO2018/207184).

Figure 10:
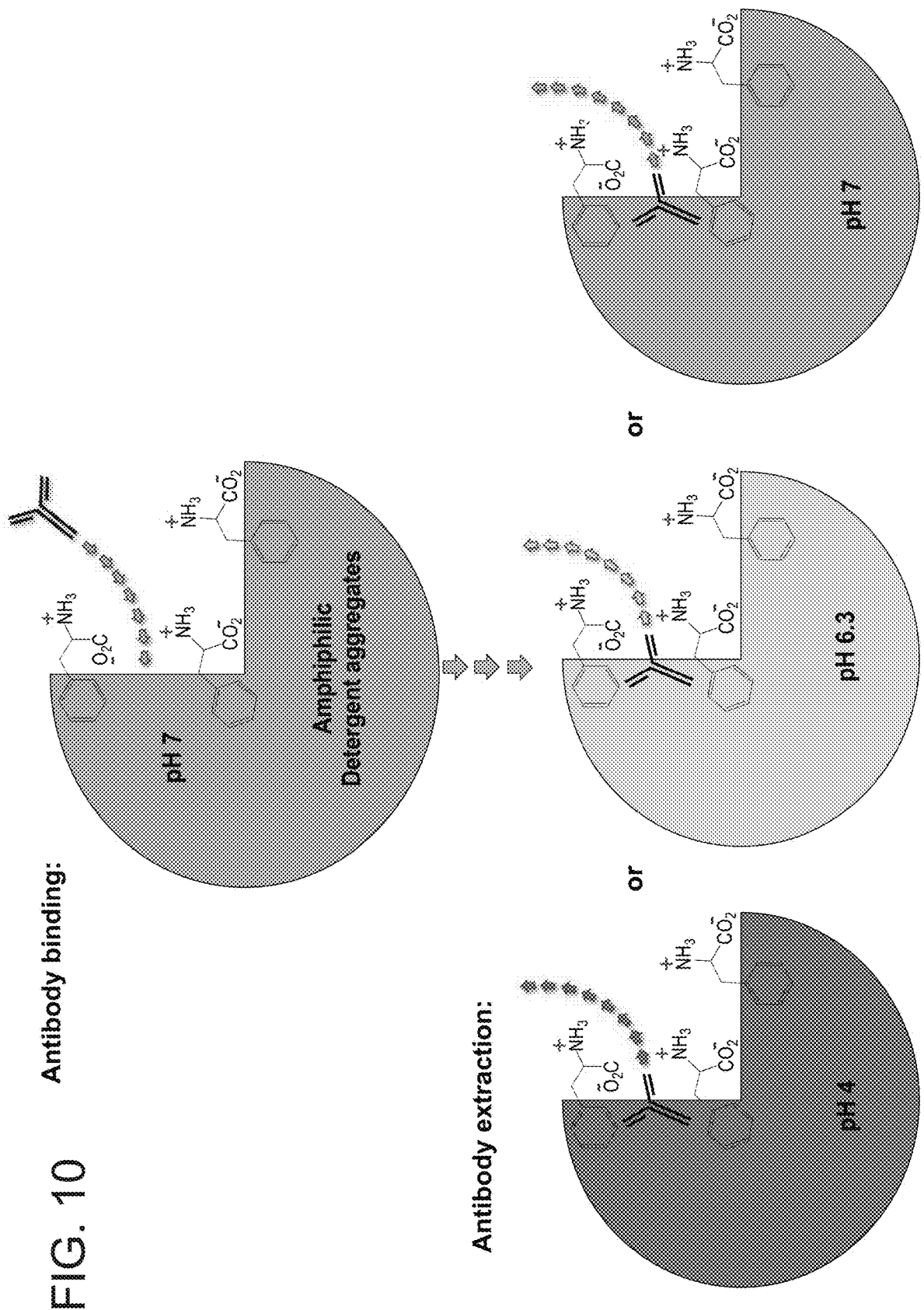
FIG. 10 is an illustration of antibody purification using micellar aggregates doped with phenylalanine (Phe). Target antibodies (e.g. IgG, IgM, IgA etc.) are captured by aggregates comprised of: (i) A non-ionic detergent (e.g. Brij-O20, Tween-20, Triton X-100 etc.); (ii) An amphiphilic chelator such as: bathophenanthroline; (c) A hydrophobic amino acid (e.g. Phe, Trp, Tyr, Ile, Val) and (d) Fe2+ ions. Pure antibodies are obtained by extraction under conditions that do not dissociate the aggregates and recover primarily the target antibody rather than, lipophilic impurities.

In order to adapt those methods to ones that could be used for large-scale antibody purification, the present inventors have now surprisingly shown that the use of hydrophobic, non-detergent agents (such as hydrophobic amino acids or phospholipids) during the purification process increase the efficiency to such an extent that the whole procedure becomes commercially viable. Without being bound to theory it was conceived that introduction of charged moieties would serve to weaken the interactions between the captured target antibody and its surrounding amphiphilic detergent aggregates. These, may include a net positive charge, a net negative charge or a zwitterion. The present inventors sought charged agents that whilst being able to weaken the interactions of the target antibody with the detergent scaffold would not affect significantly the antibody capturing step and allow higher extraction efficiency due to the lower binding affinity of the antibody to the aggregates, as exemplified in FIG. 10.

The present inventors conceived that the hydrophobic side-chains of hydrophobic amino acids would spontaneously partition into the amphiphilic detergent aggregates. Alpha amino and alpha carboxy groups of the amino acid are expected to face the aqueous polar phase and thus introduce charged headgroups into the aggregates.

Additional advantages for using hydrophobic amino acids or phospholipids in the system include that neither are expected to: (i) denature antibodies while interacting with them during the purification process; (ii) promote dissolution of the detergent aggregates, (iii) affect dramatically the aggregates granularity; (iv) interfere with recycling of the chelator via crystallization. Furthermore, neither of these agents are toxic.

Whilst reducing the present invention to practice, the present inventors demonstrated the positive effect of a number of hydrophobic amino acids on IgG antibodies under mild working conditions (i.e. pH 6.3 and 7)—see FIGS. 1 and 2A-C.

Figure 3:
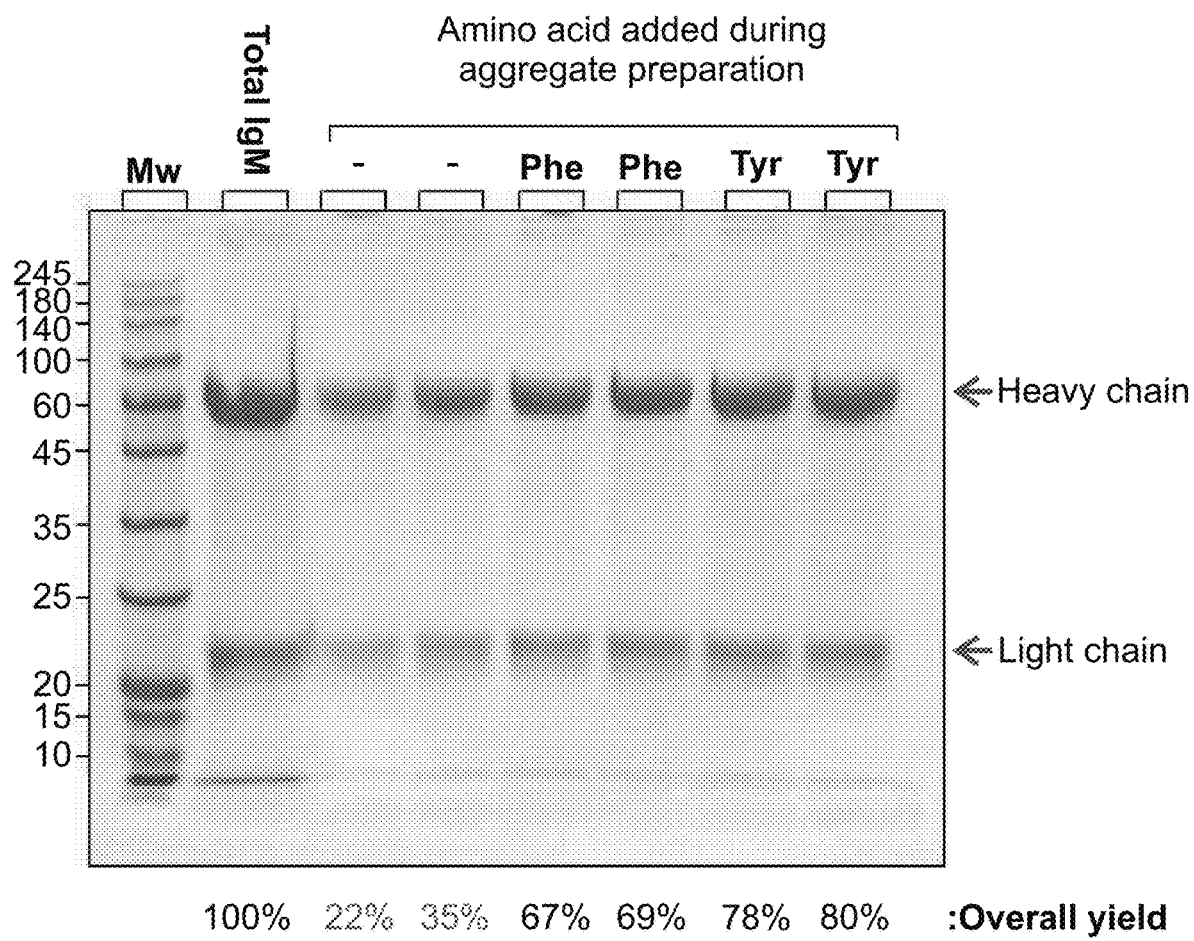
FIG. 3. Purification of bovine IgM when extracted at pH 7 with or without supplemented hydrophobic amino acids during aggregate preparation. Detergent aggregates comprised of: BRIJ™-O20 as the detergent, [(bathophenanthroline)$_3$: Fe$^{2+}$] as the amphiphilic complex and indicated amino acids (added during aggregate preparation) were incubated with hIgG (5 mg\mL) as described in the Examples, herein below. Red arrows point at the reduced heavy and light chains of the antibody. Overall yields were determined by densitometry using the ImageJ program. Mw-molecular weight protein markers. The gel is Coomassie stained.

Purification of IgM antibodies was found to be more challenging than that of IgG's. The reason for this may derive from the fact that IgM antibodies are covalent IgG pentamers and as such, can generate a greater number of H-bonds and VDW interactions with their surrounding hydrophobic detergent aggregates. This in turn, may translate into higher binding affinity between captured IgM's and the detergent scaffold, explaining the observed typical low yields of extraction (e.g. 5-15%). Surprisingly, the present inventors showed that the use of hydrophobic amino acids significantly improved the yield of purified IgM (FIG. 3).

To reduce the hypothesized high binding affinity between the target IgM and the detergent aggregates, into the latter, a second more hydrophilic detergent was added. Studied hydrophilic detergents included: octyl glucoside (OG), dodecyl maltoside (DDM), octanoic acid, decyl ammonium. These second detergents also improved the yield of purified IgM (FIGS. 6A-D, 7 and 8). Incorporation of the hydrophilic detergent into the aggregate reduced serum albumin protein retention (see FIG. 4). The present inventors propose that use of a hydrophilic detergent may allow for better separation between serum proteins and antibody. This was shown with respect to separation of serum albumin and IgG. Surprisingly, even when the stoichiometric ratio of albumin: IgG far exceeded 1:1, the two proteins were successfully separated (see FIGS. 19A-B).

Thus, according to a first aspect of the present invention there is provided a method of isolating an antibody, the method comprising contacting an aggregate comprising a hydrophobic chelator, at least one non-ionic detergent, metal ions and a non-detergent hydrophobic agent with a liquid sample comprising the antibody under conditions that allow partitioning of the antibody into the aggregate, thereby isolating the antibody.

The term "antibody" as used in this invention includes intact molecules as well as functional fragments thereof that comprise an Fc region and that are capable of binding to an epitope of an antigen.

The antibody of this aspect of the present invention may be a monospecific antibody or a bispecific antibody (i.e. capable of simultaneously binding two different or unique antigens).

Typically, the antibodies of this aspect of the present invention comprise at least one CDR in each of the variable regions.

As used herein, the terms "complementarity-determining region" or "CDR" are used interchangeably to refer to the antigen binding regions found within the variable region of the heavy and light chain polypeptides. Generally, antibodies comprise three CDRs in each of the VH (CDR HI or HI; CDR H2 or H2; and CDR H3 or H3) and three in each of the VL (CDR LI or LI; CDR L2 or L2; and CDR L3 or L3).

The identity of the amino acid residues in a particular antibody that make up a variable region or a CDR can be determined using methods well known in the art and include methods such as sequence variability as defined by Kabat et al. (See, e.g., Kabat et al., 1992, Sequences of Proteins of Immunological Interest, 5th ed., Public Health Service, NIH, Washington D.C.), location of the structural loop regions as defined by Chothia et al. (see, e.g., Chothia et al., Nature 342:877-883, 1989), a compromise between Kabat and Chothia using Oxford Molecular's AbM antibody modeling software (now Accelrys™, see, Martin et al., 1989, Proc. Natl Acad Sci USA. 86:9268; and world wide web site www(dot)bioinf-org(dot)uk/abs), available complex crystal structures as defined by the contact definition (see MacCallum et al., J. Mol. Biol. 262:732-745, 1996) and the "conformational definition" (see, e.g., Makabe et al., Journal of Biological Chemistry, 283:1156-1166, 2008).

As used herein, the "variable regions" and "CDRs" may refer to variable regions and CDRs defined by any approach known in the art, including combinations of approaches.

In one embodiment, the antibody is a polyclonal antibody.

In another embodiment, the antibody is a monoclonal antibody.

In still a further embodiment, the antibody is a recombinant antibody.

In still a further embodiment, the antibody is a humanized antibody.

In still another embodiment, the antibody is an IgG.

In still further embodiments, the antibody is IgA, IgD, IgE and IgG (e.g. IgG1, IgG2, IgG3 or IgG4).

In still further embodiments, the antibody is IgM.

Methods of producing polyclonal and monoclonal antibodies as well as fragments thereof are well known in the art (See for example, Harlow and Lane, Antibodies: A Laboratory Manual, Cold Spring Harbor Laboratory, New York, 1988, incorporated herein by reference).

Humanized forms of non-human (e.g., murine) antibodies are chimeric molecules of immunoglobulins, immunoglobulin chains which contain minimal sequence derived from non-human immunoglobulin.

Humanized antibodies include human immunoglobulins (recipient antibody) in which residues form a complementary determining region (CDR) of the recipient are replaced by residues from a CDR of a non-human species (donor antibody) such as mouse, rat or rabbit having the desired specificity, affinity and capacity. In some instances, Fv framework residues of the human immunoglobulin are replaced by corresponding non-human residues.

Humanized antibodies may also comprise residues which are found neither in the recipient antibody nor in the imported CDR or framework sequences. In general, the humanized antibody will comprise substantially all of at least one, and typically two, variable domains, in which all or substantially all of the CDR regions correspond to those of a non-human immunoglobulin and all or substantially all of the FR regions are those of a human immunoglobulin consensus sequence. The humanized antibody optimally also will comprise at least a portion of an immunoglobulin constant region (Fc), typically that of a human immunoglobulin [Jones et al., Nature, 321:522-525 (1986); Riechmann et al., Nature, 332:323-329 (1988); and Presta, Curr. Op. Struct. Biol., 2:593-596 (1992)].

Methods for humanizing non-human antibodies are well known in the art. Generally, a humanized antibody has one or more amino acid residues introduced into it from a source which is non-human. These non-human amino acid residues are often referred to as import residues, which are typically taken from an import variable domain. Humanization can be essentially performed following the method of Winter and co-workers [Jones et al., Nature, 321:522-525 (1986); Riechmann et al., Nature 332:323-327 (1988); Verhocyen et al., Science, 239:1534-1536 (1988)], by substituting rodent CDRs or CDR sequences for the corresponding sequences of a human antibody. Accordingly, such humanized antibodies are chimeric antibodies (U.S. Pat. No. 4,816,567), wherein substantially less than an intact human variable domain has been substituted by the corresponding sequence from a non-human species. In practice, humanized antibodies are typically human antibodies in which some CDR residues and possibly some FR residues are substituted by residues from analogous sites in rodent antibodies. Human antibodies can also be produced using various techniques known in the art, including phage display libraries [Hoogenboom and Winter, J. Mol. Biol., 227:381 (1991); Marks et al., J. Mol. Biol., 222:581 (1991)]. The techniques of Cole et al. and Boerner et al. are also available for the preparation of human monoclonal antibodies (Cole et al., Monoclonal Antibodies and Cancer Therapy, Alan R. Liss, p. 77 (1985) and Boerner et al., J. Immunol., 147(1):86-95 (1991)].

Similarly, human antibodies can be made by introduction of human immunoglobulin loci into transgenic animals, e.g., mice in which the endogenous immunoglobulin genes have been partially or completely inactivated. Upon challenge, human antibody production is observed, which closely resembles that seen in humans in all respects, including gene rearrangement, assembly, and antibody repertoire. This approach is described, for example, in U.S. Pat. Nos. 5,545,807; 5,545,806; 5,569,825; 5,625,126; 5,633,425; 5,661,016, and in the following scientific publications: Marks et al., Bio/Technology 10: 779-783 (1992); Lonberg et al., Nature 368: 856-859 (1994); Morrison, Nature 368 812-13 (1994); Fishwild et al., Nature Biotechnology 14, 845-51 (1996); Neuberger, Nature Biotechnology 14: 826 (1996); and Lonberg and Huszar, Intern. Rev. Immunol. 13, 65-93 (1995).

When using recombinant techniques, the antibody can be produced intracellularly, in the periplasmic space, or directly secreted into the medium. If the antibody is produced intracellularly, as a first step, the particulate debris, either host cells or lysed cells, can be removed, e.g., by centrifugation or ultrafiltration. Where the antibody is secreted into the medium, supernatants from such expression systems can be first concentrated using a commercially available protein concentration filter, e.g., an Amicon™ or Millipore Pellicon™ ultrafiltration unit.

Lysis of the cells may be performed by a variety of methods, including mechanical shear, osmotic shock, or enzymatic treatments. Such disruption releases the entire contents of the cell into the homogenate, and in addition produces subcellular fragments that are difficult to remove due to their small size. These are generally removed by differential centrifugation or by filtration. Where the antibody is secreted, supernatants from such expression systems are generally first concentrated using a commercially available protein concentration filter, e.g., an Amicon™ or Millipore Pellicon™ ultrafiltration unit. Where the antibody is secreted into the medium, the recombinant host cells can also be separated from the cell culture medium, e.g., by tangential flow filtration.

In one embodiment, the liquid sample in which the antibody is comprised is a biological sample, e.g. blood, plasma or serum.

In another embodiment, the liquid sample in which the antibody is comprised is a cell lysate.

As used herein, the term "cell lysate" refers to an aqueous solution of cellular biological material which comprises the antibody, wherein a substantial portion of the cells of the cellular material have become disrupted and released their internal components.

In one embodiment, the cell lysate is prepared from whole cells.

In the case of a whole cell lysate, it will be appreciated that following cell membrane disruption, the cell lysate may be treated so as to remove organelles greater than about 2 microns (e.g. cell nucleii). Thus, for example the whole cell lysate may be centrifuged so as to precipitate cell nucleii from the cell lysate. Exemplary centrifugation conditions include 1-5 minutes at 500-1000×g (e.g. 2 minutes at 985× g).

The cell lysate may be prepared from any cell that expresses an antibody. The cells may be eukaryotic (e.g. mammalian, plant, fungus) or prokaryotic (bacteria).

In another embodiment, the cells secrete antibody into the cell medium.

The cell may be genetically modified so as to express the antibody. In another embodiment, the cell is not genetically modified.

Exemplary cells that are contemplated include, but are not limited to gram negative bacterial cells, such as *E. Coli*; gram positive bacterial cells such as Bacillus brevis, Bacillus subtilis, Bacillus megaterium and Lactobacilli (e.g. Lactobacillus zeae/casei or Lactobacillus paracasei); yeast cells such as Pichia pastoris, Saccharomyces cerevisiae, Hansenula polymorpha, Schizosaccharomyces pombe, Schwanniomyces occidentalis, Kluyveromyces lactis, and Yarrowia lipolytica; filamentous fungii such as Trichoderma and Aspergillus; insect cells; mammalian cells including Chinese hamster ovary (CHO) cells and plant cells.

In one embodiment, the cells have been immortalized and are part of a cell line—e.g. hybridoma. As mentioned, the isolation method of this aspect of the present invention is carried out by contacting the medium comprising the antibody with aggregates of non-ionic detergent, hydrophobic chelator and metal ions.

Examples of cell media for culturing antibody producing cells include hybridoma media—e.g. serum-free hybridoma media. Such media are readily available from Companies such as Gibco, Thermo Fisher Scientific and Sigma-Aldrich.

In one embodiment, the liquid sample comprises a serum albumin such as horse or human serum albumin (HSA) or bovine serum albumin (BSA).

In another embodiment, the liquid sample comprises coagulation factors.

Preferably the serum albumin is present at a concentration of less than 0.5 mg/ml—for example between 0.1-0.5 mg/ml.

Prior to the isolation step, the liquid sample or medium comprising the antibody may optionally be clarified.

As used herein, the term "clarified" refers to a sample (i.e. a cell suspension) having undergone a solid-liquid separation step involving one or more of centrifugation, microfiltration and depth filtration to remove host cells and/or cellular debris. A clarified fermentation broth may be a cell culture supernatant. Clarification is sometimes referred to as a primary or initial recovery step and typically occurs prior to any chromatography or a similar step.

The first step of the isolation comprises obtaining an aggregate comprising a hydrophobic chelator, at least one non-ionic detergent, a non-detergent hydrophobic agent and metal ions.

The term "non-ionic detergent" refers to detergents that comprise uncharged, hydrophilic headgroups.

In one embodiment, the non-ionic detergent comprises a sugar moiety (e.g. a glucose moiety or a maltose moiety) or a primary amine i.e. a cation (e.g. decyl amine).

In still another embodiment, the non-ionic detergent comprises a polar head group, examples of which include $C_{12}E_8$, Dodecyl octaethylene glycol ether. Further examples are provided herein below.

Some non-ionic detergents are based on polyoxyethylene or a glycoside, or a maltoside. Common examples of the former include TWEEN™, TRITON™, and the BRIJ™ series. These materials are also known as ethoxylates or PEGlyates and their metabolites, nonylphenol. Glycosides have a sugar as their uncharged hydrophilic headgroup. Examples include octyl thioglucoside and maltosides. HEGA and MEGA series detergents are similar, possessing a sugar alcohol as headgroup.

According to a particular embodiment, the non-ionic detergent is a polysorbate surfactant. Examples of such include, but are not limited to of polysorbate 20, polysorbate 40, polysorbate 60 and polysorbate 80.

In one embodiment, the non-ionic detergent is polysorbate 20.

Other exemplary non-ionic detergents contemplated by the present invention include those that belong to the pluronic family e. g. F-68 and F-127.

In one embodiment, the aggregate comprises at least two non-ionic detergents.

Exemplary pairs of non-ionic detergents contemplated by the present invention include a polysorbate surfactant (e.g. polysorbate 20) and DDM; a polysorbate surfactant (e.g. polysorbate 20) and octanoic acid; a detergent of the BRIJ™ family (e.g. BRIJ™-O20) and DDM; a detergent of the BRIJ™ family (e.g. BRIJ™-O20) and octanoic acid; a detergent of the TRITON™ and DDM; a detergent of the TRITON™ family (e.g. TRITON™-O20) and octanoic acid.

An example of a combination of three non-ionic detergents includes 1) polysorbate 20 or BRIJ™-O20, 2) DDM and 3) decyl amine.

As used herein, the term "chelator" refers to a compound which binds metal ions from solution, by the formation or presence of two or more separate co-ordinate bonds between a polydentate ligand and a single central atom. The chelator of this aspect of the present invention is capable of chelating the metal ion which is used for the isolation. Preferably, the chelator binds electrostatically (non-covalently) to the metal ion. According to a particular embodiment, the chelator is capable of chelating metal ions with a ratio of chelator to metal of 2:1 or greater.

The hydrophobicity of the chelator is such that it is capable of partitioning into the aggregates of the non-ionic detergent. In one embodiment, the chelator is capable of embedding into the aggregates of the non-ionic detergent.

The hydrophobic chelator may be solubilized prior to use. In one embodiment, the hydrophobic chelator is solubilized in methanol.

According to a particular embodiment, the hydrophobic chelator is solubilized in a non-volatile, water-miscible organic solvent (e.g. dimethyl sulfoxide (DMSO) or dimethyl sulfide (DMS)).

In one embodiment, the hydrophobic chelator comprises at least 8 carbons (for example in a chain, or in a ring) and does not comprise charged groups.

In some embodiments, the hydrophobic chelator is 8-Hydroxyquinoline or a derivative thereof. Exemplary derivatives of 8-Hydroxyquinoline include, but are not limited to 2-methyl-8-hydroxyquinoline (CH3-HQ), 5,7-dichloro-2-methyl-8-hydroxyquinoline (C12-CH3-HQ), 5,7-dibromo-8-hydroxyquinoline (Br2-HQ), 5-sulfo-7-iodo-8-hydroxyquinoline (ferron) and 5-sulfo-8-hydroxyquinoline (SO3H-HQ).

In some embodiments, the hydrophobic chelator comprises a phenanthroline, for example a 1,10-Phenanthroline. Other phenanothrolines are also contemplated which have not been substituted with hydrophilic substituents.

Exemplary hydrophobic phenanthrolines include, but are not limited to bathophenanthroline, and N-(1,10-Phenanthrolin-5-yl)alkylamide), with the alkyl being from 1-10 carbon atoms in length. Exemplary N-(1,10-Phenanthrolin-5-yl)alkylamide) compounds include N-(1,10-Phenanthrolin-5-yl)methanamide) (Phen-C1), N-(1,10-Phenanthrolin-5-yl)ethanamide) (Phen-C2), N-(1,10-Phenanthrolin-5-yl)propanamide) (Phen-C3), N-(1,10-Phenanthrolin-5-yl)butanamide) (Phen-C4), N-(1,10-Phenanthrolin-5-yl)pentanamide) (Phen-C5), N-(1,10-Phenanthrolin-5-yl)hexanamide) (Phen-C6), N-(1,10-Phenanthrolin-5-yl)heptanamide) (Phen-C7), N-(1,10-Phenanthrolin-5-yl)octanamide) (Phen-C8), N-(1,10-Phenanthrolin-5-yl)nonanamide) (Phen-C9), N-(1,10-Phenanthrolin-5-yl)decanamide) (Phen-C10).

In some such embodiments, the phenanthroline is selected from the group consisting of bathophenanthroline, N-(1,10-Phenanthrolin-5-yl)hexanamide) (Phen-6), N-(1,10-Phenanthrolin-5-yl)decanamide) (Phen-C10) and N-(1,10-Phenanthrolin-5-yl)octanamide) (Phen-C8).

Herein throughout, an "alkylamide" describes a —NH—C(=O)—R, wherein R is alkyl.

The term "alkyl" describes a saturated aliphatic hydrocarbon including straight chain and branched chain groups. Preferably, the alkyl group has 1 to 20 carbon atoms in length. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. More preferably, the alkyl is a medium size alkyl having 1 to 10 carbon atoms. The alkyl group may be substituted or unsubstituted. Substituted alkyl may have one or more substituents, whereby each substituent group can independently be, for example, alkyl, cycloalkyl, alkenyl, alkynyl, aryl, and heteroaryl. Additional substitutents may include, for example, hydroxyalkyl, trihaloalkyl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine, as long as the functionalities of the chelator are maintained.

In some embodiments, the phenanthroline is Phen-C10 or Phen-C8.

Additional examples of hydrophobic chelators include acidic organophosphorus chelators, for example DEHPA, EHEHPA and DTMPPA; neutral organophosphorus chelators, for example TBP and tri-n-octylphosphine oxide (TOPO), bifunctional organophosphorus chelators, for example CMPO and N,N,N',N'-tetraoctyl-3-oxamentanediamide (TOGDA); basic chelators, for example tri-n-octylamine (TOA) and tricaprylmethylammonium chloride. Other chelators known to those of skill in the art may also be used, including hydroxyoximes, for example 5,8-diethyl-7-hydroxy-6-dodecane oxime and 2-hydroxy-5-nonylacetophenon oxime, crown ethers, for example di-t-butyl-dicyclohexano-18-crown-6, and dithiosemicarbazone.

According to some embodiments, the hydrophobic chelator is present in the medium (e.g. aqueous solution) at a concentration in the range of about 0.1% to about 10% (v/v), such as, for example, about 0.5% to about 10% (v/v), about 1% to about 10% (v/v) such as for example about 5%, about 6%, about 7%, about 8%, about 9%, or about 10% of 20 mM solution of chelator.

Metal ions which are present in the aggregate include $Zn^{2+}$, $Fe^{2+}$, $Mn^{2+}$, $Ni^{2+}$ and $Co^{2+}$.

According to a particular embodiment, the metal ions comprise iron ions.

The metal salt used to generate the metal ions may comprise a monovalent anion including, but not limited to fluoride, bromide and chloride.

According to a specific embodiment, the iron salt is iron chloride.

In some embodiments, the metal ion is present in the medium (i.e. aqueous solution) at a concentration in the range of about 0.1% to about 10% (v/v), such as, for example, about 0.5% to about 10% (v/v), about 1% to about 10% (v/v), about 5%, about 6%, about 7%, about 8%, about 9%, or about 10% of 50 mM solution of metal ion (e.g. $Fe^{2+}$).

The non-detergent hydrophobic agent which is used in the aggregate is typically between 80 Da to 1000 kda. Typically the non-detergent agent is charged at working pH conditions (e.g. between pH 2.5 and pH 9). The non-detergent agent may be positively charged, negatively charged or may comprise a zwitter ion at working pH conditions.

In one embodiment, the non-detergent hydrophobic agent is a hydrophobic amino acid, examples of which include Phenylalanine (Phe), Tyrosine (Tyr), Tryptophan (Trp), Isoleucine (Ile) and Valine (Val). In one embodiment, the hydrophobic amino acid is phenylalanine or tyrosine.

In another embodiment, the non-detergent hydryophobic agent is a phospholipid—e.g. phosphatidylinositol or phosphatidylserine.

The conditions of the incubation are such that aggregates are formed comprising the metal ion (e.g. $Fe^{2+}$), the hydrophobic chelator, the non-detergent hydrophobic agent and the at least one non-ionic detergent.

Thus, for example, generation of aggregates is typically carried out at a temperature of about 0° C. to about 25° C. and more preferably from about 4° C. to about 25° C.

Typically the working pH is between 2.5-9 and in some embodiments between 3-8.

The concentration of salt (e.g. NaCl) in the aggregates is typically, below 100 mM and more preferably below 50 mM. In one embodiment, the concentration of salt is below 40 mM, below 30 mM, below 20 mM, below 10 mM or even below 5 mM. Exemplary ranges include 20-100 mM, 20-50 mM, 0-50 mM, 0-40 mM, 0-30 mM, 0-25 mM, 0-20 mM. In one particular embodiment, the concentration of salt is about 25 mM.

In some embodiments, contacting the non-ionic detergent with a hydrophobic chelator is performed prior to contacting with a metal ion (e.g. $Fe^{2+}$).

In other embodiments, contacting the non-ionic detergent with a hydrophobic chelator is performed concomitantly to contacting with a metal ion (e.g. $Fe^{2+}$).

In still further embodiments, the hydrophobic chelator is solubilized (as described herein above) and then contacted with the non-detergent hydrophobic agent (which may also be solubilized using a solvent described herein above) together with the non-ionic detergent. A mixture of the metal ions (e.g. $Fe^{2+}$) is then added.

Preferably, the aggregates that are formed are greater than 500 nM in diameter.

Preferably, the aggregates that are formed are greater than 1000 nM in diameter.

Preferably, the aggregates that are formed are greater than 2000 nM in diameter.

Typical contemplated ranges are between 500-3000 nM in diameter, 1000-3000 nM in diameter or 500-2000 nM in diameter.

Once aggregates are formed, they are contacted with the liquid sample (e.g. cell lysate) or liquid biological sample (e.g. blood or serum) which contains the antibody under conditions that allow partitioning of the antibody into the aggregate.

Figure 19B:
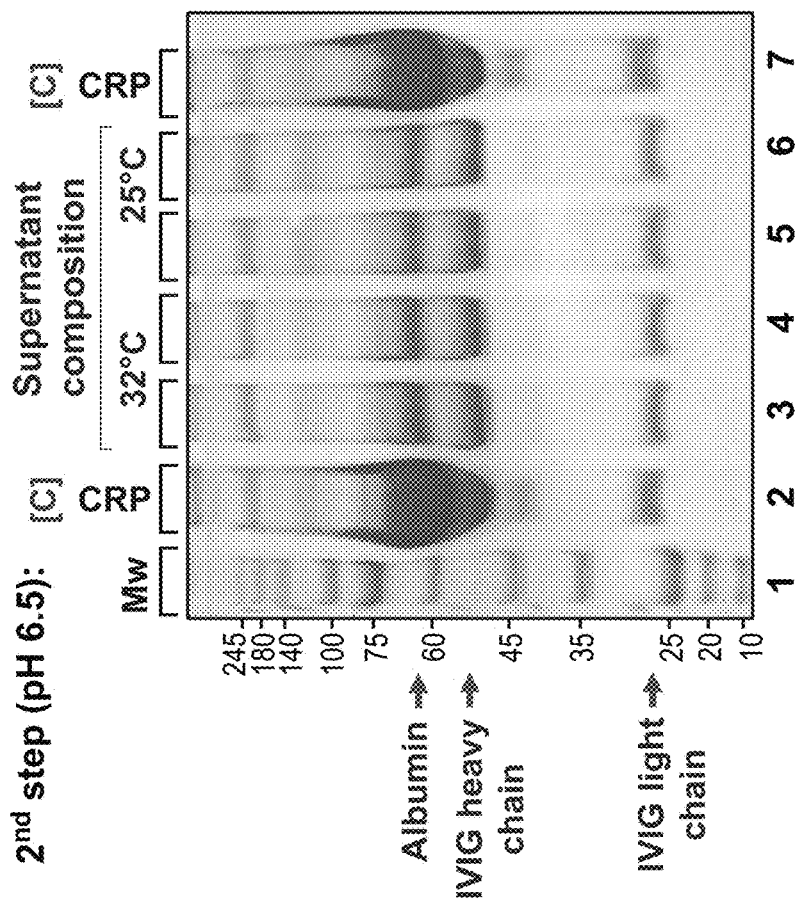
FIGS. 19A-B.
Figure 19A:
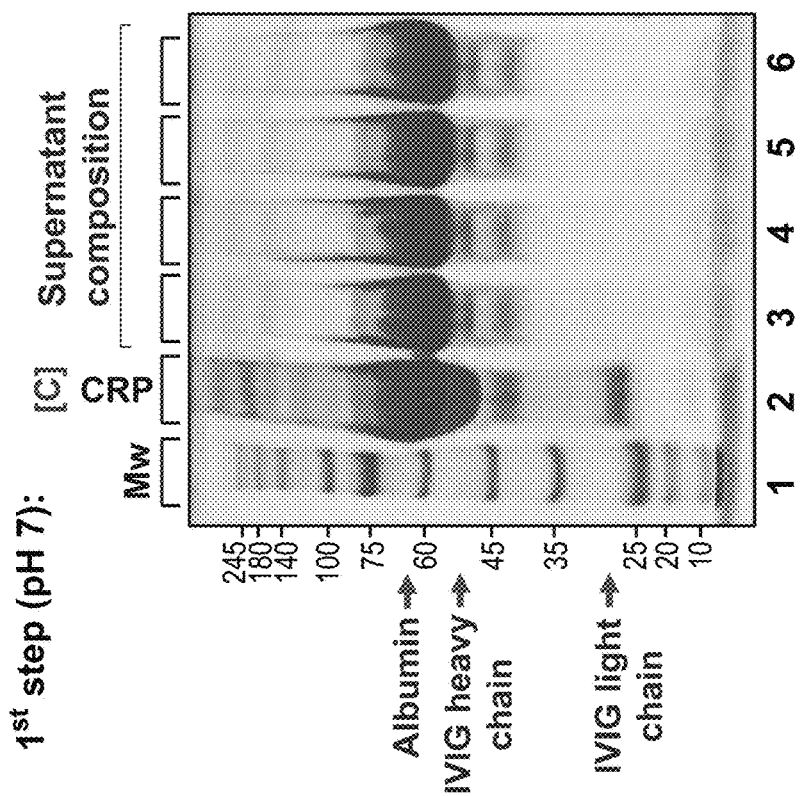

In a particular embodiment, the conditions are selected such that it prevents partitioning of other proteins (e.g. plasma derived proteins such as serum albumin) present in the medium (or biological fluid sample) from partitioning into the aggregate (see FIGS. 19A-B). Additional proteins present in the blood which may be selectively retained or released using the above described methodology include, but are not limited to fibrinogen, Factor II, Thrombin (factor IIa) Factor V, Factor VII, Factor VIII, Factor IX, Factor X, Factor XI, Factor XIII, Von Willebrand factor, Antithrombin, Alpha 1-antitrypsin, C1-esterase inhibitor and Protein C.

The present inventors have now shown that the partitioning may be effected even when the "other protein" is present at a higher stoichiometric ratio than the antibody which is being purified. Thus, for example the "other protein" (e.g. albumin) may be present at a ratio about 2:1, 4:1, 6:1, or even 10:1 over the antibody which is being purified, and the present inventors have shown it is still possible to separate between the two identities.

Figure 5:
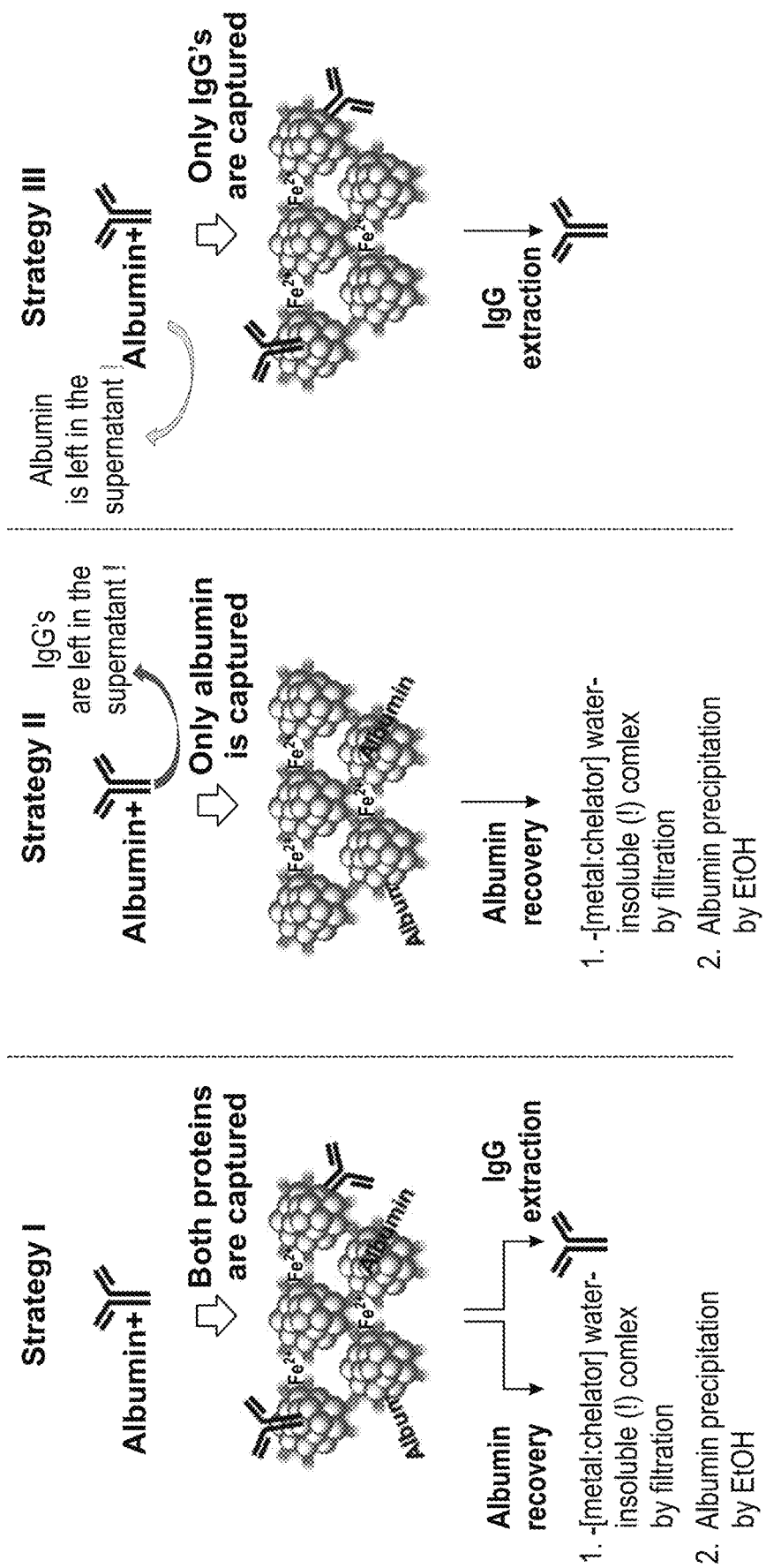
FIG. 5. Illustration of 3 strategies which may be used to separate the albumins from antibodies. Presented strategies, rely on the ability of generating detergent aggregates that either bind or repel antibodies (or albumins). In Strategy I, albumins and antibodies are both captured by the aggregates. The antibody is then extracted under conditions that keep the majority of the albumin bound to the aggregates while the latter is then recovered from the aggregates via precipitation (by cold EtOH for example). In Strategy II, albumins are captured preferentially while the antibody is left in the supernatant. The bound albumin is recovered as in Strategy I. In Strategy III, antibodies are captured preferentially while the albumin is left in the supernatant. The bound antibody can then be extracted at any desired pH (e.g. 4, 6.3, 7 etc.).
Figure 6B:
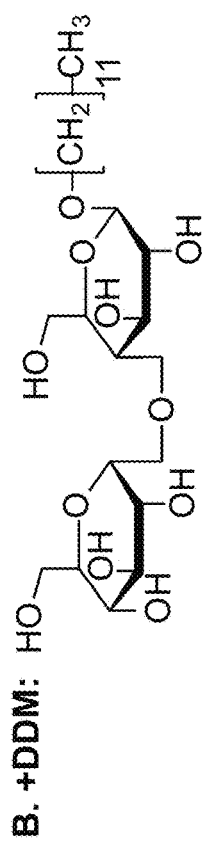
FIGS. 6A-D are photographs of Coomassie-stained gels demonstrating the purification of bovine IgM with detergent aggregates. A. Lane 1—Molecular weight markers (Mw); lane 2: Total IgM present; lanes 3-5: IgM recovered via indicated detergent aggregates comprised of the chelator: bathophenanthroline (batho) and Fe$^{2+}$ ions; lanes 6-8 supernatant composition after the IgM capturing step using indicated detergent aggregates; lane 9—band intensity representing 5% of Coomassie stained Tween-20 aggregates. B-D. As in A, but in the presence of indicated secondary detergents added during aggregate formation. H, L and A represent the Heavy chain, Light chain and detergent Aggregates, respectively.
Figure 6B:
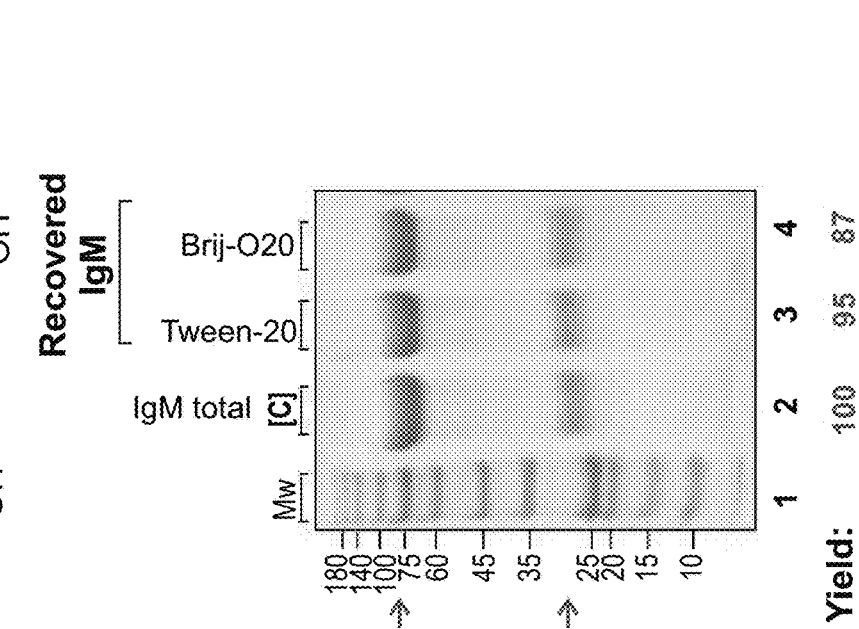
Figure 6A:
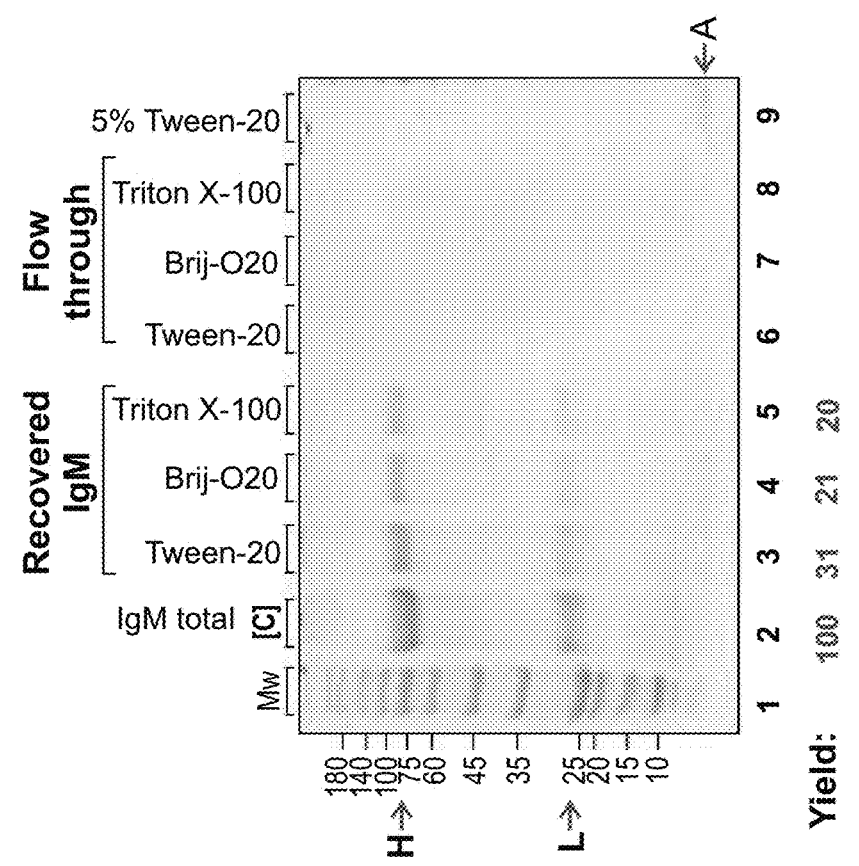
Figure 6D:
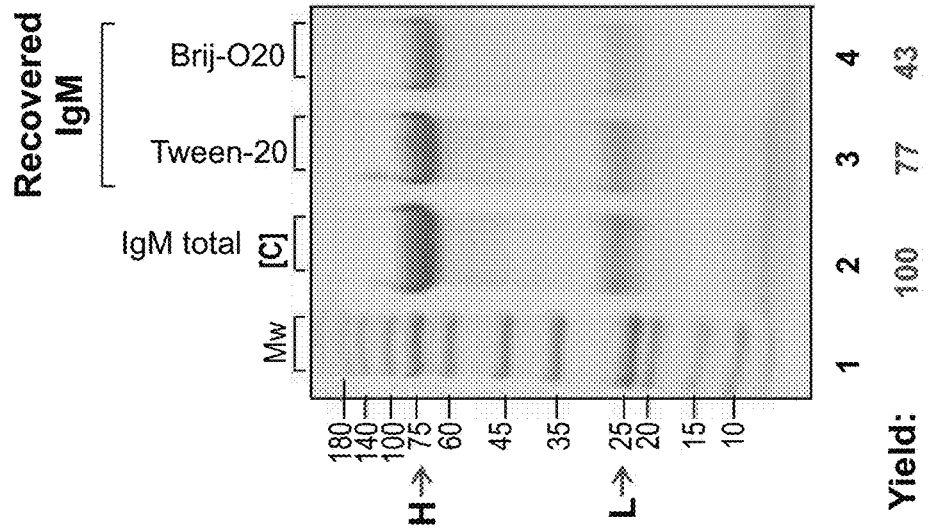
Figure 6C:
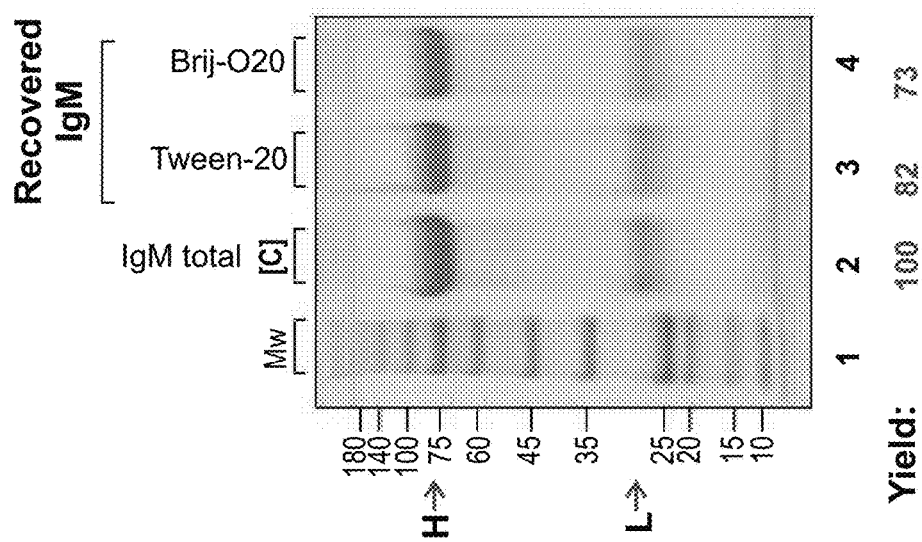
Figure 7:
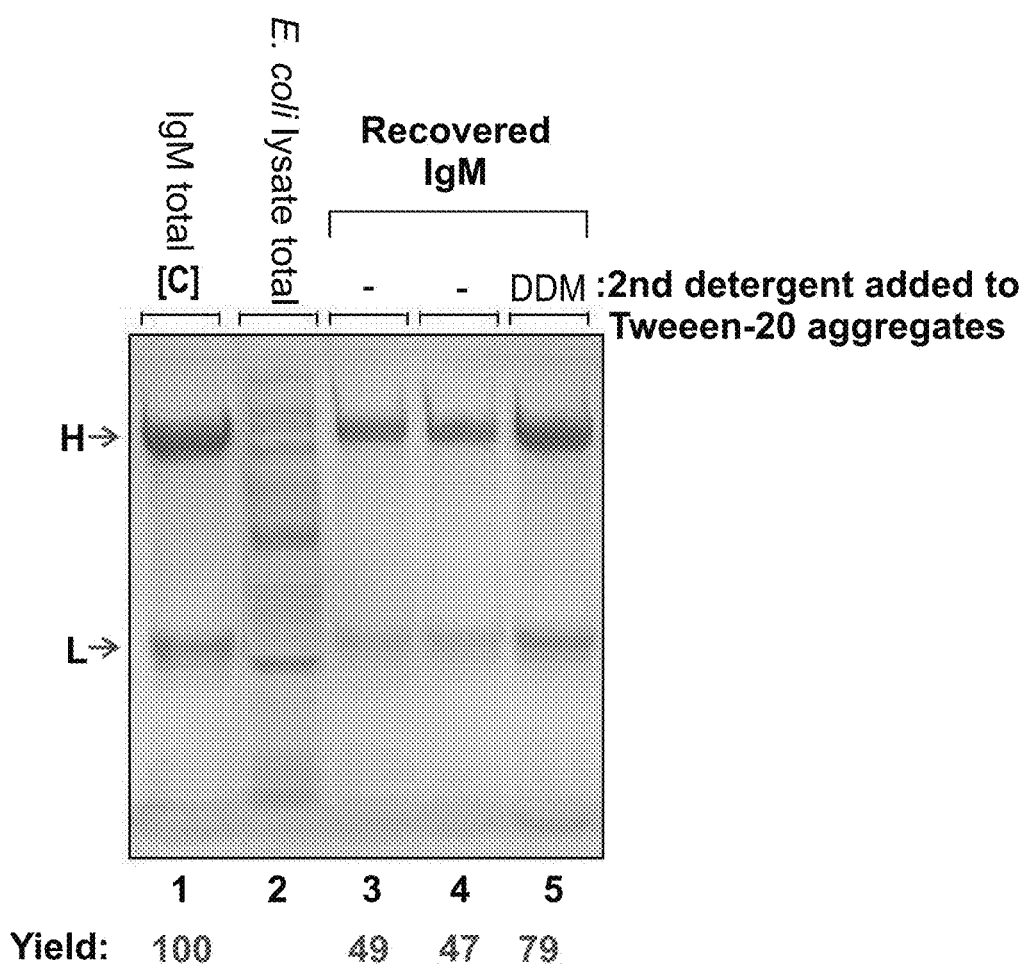
FIG. 7 is a photograph of a Coomassie-stained gel demonstrating the purification of bovine IgM from *E. coli* lysate using detergent aggregates. Lane 1—Total IgM present; lane 2—total *E. coli* lysate added. lanes 3-5: IgM recovered via detergent aggregates comprised of: [Tween-20:batho:Fe$^{2+}$] and indicated secondary detergent: DDM. H, L, represent the Heavy chain, Light chain, respectively.
Figure 8:
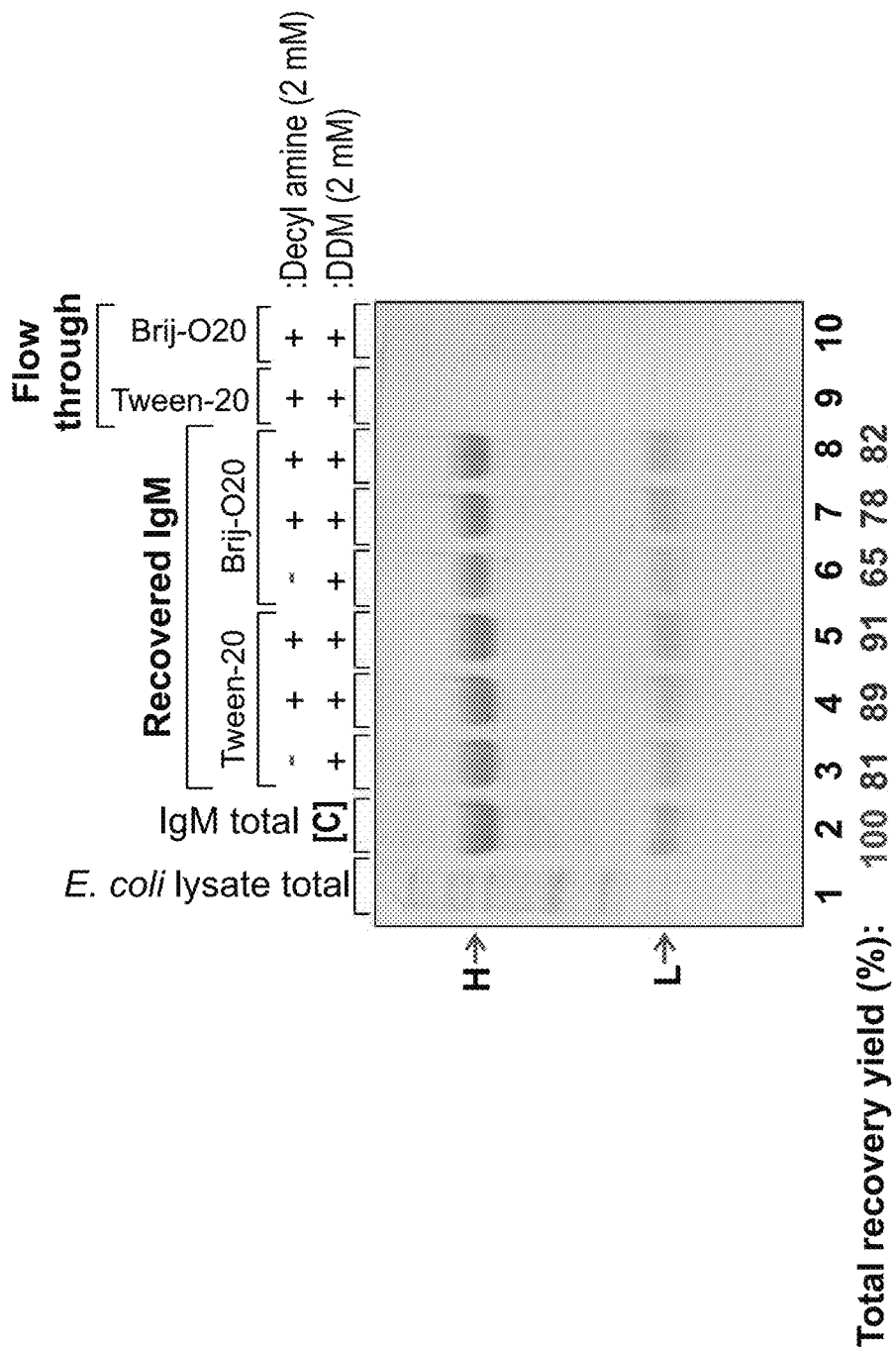
FIG. 8 is a photograph of a Coomassie-stained gel demonstrating the effect of decyl amine and DDM on recovery yields of bovine IgM from *E. coli* lysate and either TWEEN-20 or BRIJ™-O20 aggregates. A. Lane 1—Total *E. coli* lysate; Lane 2—total bovine IgM present; lane3: recovered IgM from TWEEN-20 aggregates supplemented with DDM at indicated concentration: lanes 4-5: as in lane 3 and the addition of decyl amine at indicated concentration; lane 6, as in lane 3 but the presence of BRIJ™-O20 aggregates; lanes 7-8, as in lane 6 and the addition of decyl amine at indicated concentration; lanes 9-10: composition of supernatant after IgM binding with indicated detergent aggregates containing decyl amine and DDM at indicated concentration. Process efficiency is indicated below the gel. H and L represent the Heavy chain and Light chains, respectively.
Figure 9:
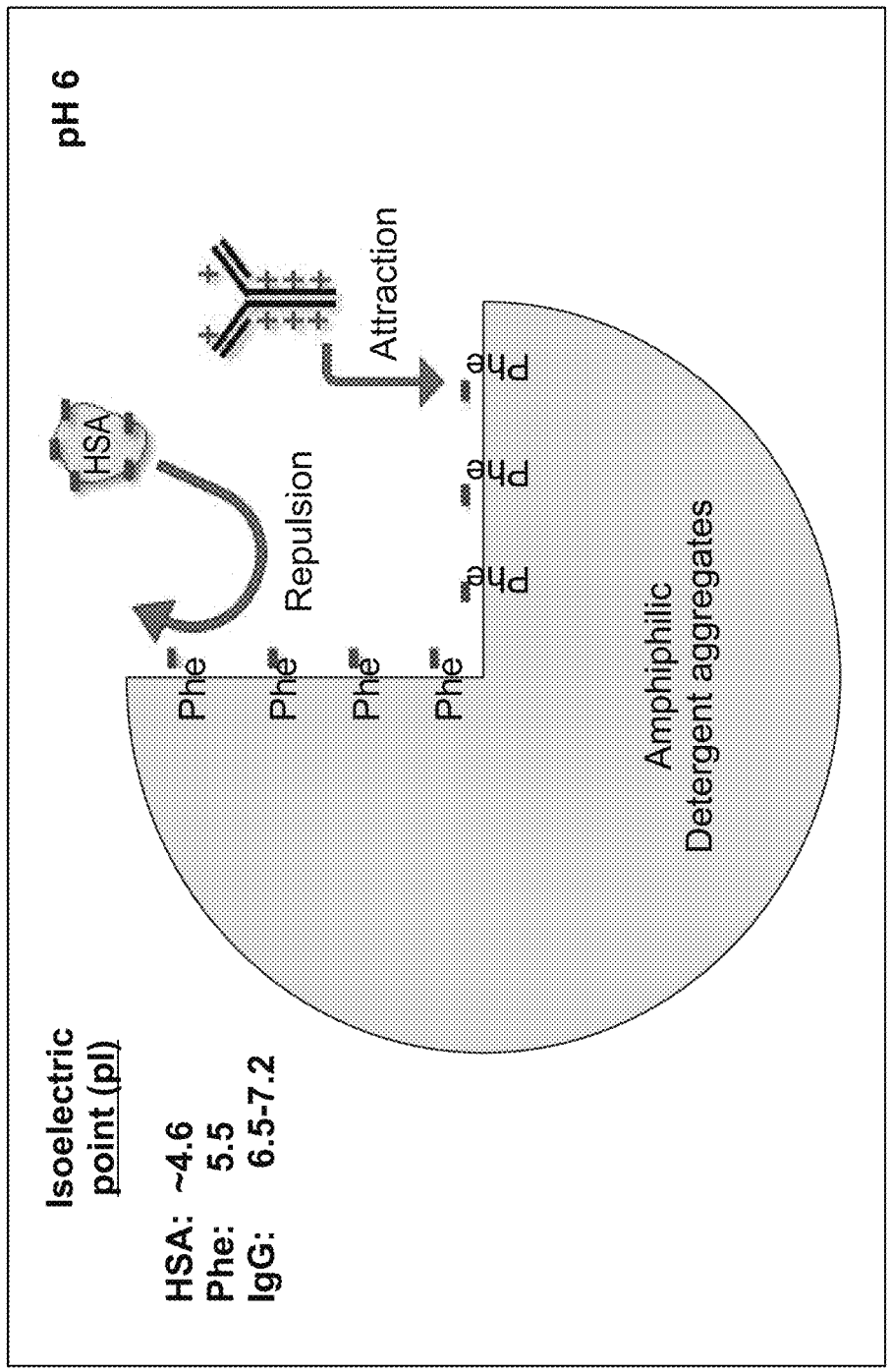
FIG. 9 is an illustration showing how differences in the isoelectric point (pI) of Phe, HSA and IgG's may allow separation of the albumin from the antibody. Indicated pI values are expected to promote repulsion of negatively charged albumins (e.g. human serum albumin, HSA) from negatively charged phenylalanine (Phe) bound to the detergent aggregates and in parallel, attract positively charged IgG's at pH 6. Such a rejection\attraction phenomenon may be observed over a wider range of pH values (e.g. 4.5-7.4) and hence, could be utilized for fractionation of intravenous IgG's (IVIG's) from HSA and other plasma proteins.

In still another embodiment, the conditions are selected such that it prevents partitioning of the antibody into the aggregate whilst allowing other proteins (e.g. those listed above) present in the medium (e.g. fresh plasma, frozen plasma or blood) to partition into the aggregate. The partitioning may be controlled by adapting the pH of the reaction such that the PI of the different proteins are of opposite charges—see for example FIG. 9. Other strategies for separating antibodies from plasma proteins are summarized in FIG. 5.

Once this happens (seconds to hours—for example 5 minutes to 1 hour), precipitation of the complex (i.e. aggregate) may be facilitated by filtration, prior to extraction.

The filters may be selected according to the size of the aggregates.

In one embodiment, the filters are 0.2 micron filters, 0.22 micron filters or even 0.45 micron filters.

According to a particular embodiment, the filters are 0.1 micron filters.

Following the optional filtration step, the antibody may be released from the pelleted complex i.e. solubilized.

Initially, the pellet may be washed—for example in a low salt solution (e.g. below 50 mM e.g. 20 mM NaCl solution).

Extraction may be effected with a buffer having a pH between 3-7 or 3-6, and more preferably between 4-6.5, 5-7 or 3.8-5. In one embodiment, the buffer is a carboxylic buffer, examples of which include, but are not limited to, sodium acetate and sodium citrate. An exemplary pH of sodium acetate is about pH 4.6.

In another embodiment, the extraction buffer comprises an amino acid. In one embodiment, the buffer comprises a single amino acid. In another embodiment, the buffer comprises at least two amino acids.

In one embodiment, the amino acid is one which can competes for (i) hydrophobic interactions between the antibody side chains and the detergent aggregate (e.g. valine or isoleucine); (ii) ionic and/or H-bond interactions between the antibody side chains and the detergent aggregate (e.g. aspartic acid, glutamic acid or arginine); or (iii) metal chelation interactions between the antibody side chains and the detergent aggregate (e.g. histidine).

In a particular embodiment, the amino acid buffer is glycine, valine or isoleucine. In another embodiment, the amino acid buffer is isoleucine.

An exemplary pH of amino acid buffers is about pH 3.8 or pH 4.

Additional buffers may be used for extraction at higher pHs (e.g. above pH 6), such as Tris based buffers.

The sample may be heated for a length of time that enhances extraction—for example (1-60 minutes), 1 minute, 5 minutes, 10 minutes. The temperature is selected such that it does not have an impact on the activity of the extracted antibody and does not cause the detergent aggregate to undergo dissolution. An exemplary temperature is between 25-35° C. According to a particular embodiment, the sample is heated for 5 minutes at 32° C.

To enhance the purity of the released antibody, salt may be added to the buffer (e.g. between 5-50 mM NaCl or 10-20 mM NaCl). To enhance the amount of antibody released from the complexed pellet, the present inventors contemplate using buffers which do not contain salt. It will be appreciated however, that the purity of the released antibody may then be compromised.

It will be appreciated that the metal chelator may be reused in subsequent rounds of purification so as to purify additional antibodies as further described herein below.

In order to dissociate the aggregate, the detergent is solubilized by adding salt to the medium (which comprises residual antibodies that were not extracted during the purification process). Exemplary salts include NaCl (e.g. at concentrations between 0.25-1M) and ammonium sulfate, AS. The complex may then be dissociated using a water-soluble chelator (e.g. EDTA or EGTA) that could compete with the hydrophobic chelator on binding to the metal ions. The chelator can optionally be added together with a solvent (as described herein above). The solution is then heated to a temperature between 80 degrees and 100 degrees, for example 95 degrees for between 2-5 minutes.

Once disassociated, the hydrophobic chelator (e.g. bathophenanthroline) can be recrystallized so as to exclude any residual antibody which has not been removed during the first round of purification.

Recrystallization of bathophenanthroline is accomplished due to its extensive planar aromatic system. This inherent planarity and lipophilic nature of the chelator are ideal for promoting pi-pi (Π-Π) stacking between bathophenanthrolines and thus represent the driving force for its rapid crystal growth in aqueous media. The presence of EDTA does not interfere with the above, since EDTA is charged and as such, is repelled from the highly lipophilic faces of the growing crystals.

The recrystallized, purified hydrophobic chelator can then be re-used to generate additional aggregates, which in turn can be used to aid in the purification of additional antibodies.

Depending on the intended use of the antibody that is isolated and optionally solubilized, the antibody, may be subjected to further purification steps. This may be effected by using a number of biochemical methods which are well known in the art. Examples include, but are not limited to, fractionation on a hydrophobic interaction chromatography (e.g. on phenyl sepharose), ethanol precipitation, isoelectric focusing, reverse phase HPLC, chromatography on silica, chromatography on heparin sepharose, anion exchange chromatography, cation exchange chromatography, chromatofocusing, SDS-PAGE, ammonium sulfate precipitation, hydroxylapatite chromatography, gel electrophoresis, dialysis, viral inactivation (e.g. viral filtration) and ultrafiltration.

Anion-exchange chromatography is a process that separates substances based on their charges using an ion-exchange resin containing positively charged groups, such as diethyl-aminooctyl groups (DEAE). In solution, the resin is coated with positively charged counter-ions (cations). Anion exchange resins will bind to negatively charged molecules, displacing the counter-ion.

Cation-exchange chromatography is a process that separates substances based on their charges using an ion-exchange resin containing negatively charged groups, such as carboxymethyl (CM), sulfoethyl(SE), sulfopropyl(SP), phosphate(P) and sulfonate(S). In solution, the resin is coated with negatively charged counter-ions (anions). Cation exchange resins will bind to positively charged molecules, displacing the counter-ion.

The phrase "viral inactivation", as used herein, refers to a decrease in the activity of adventitious enveloped viruses in a particular sample ("inactivation"). Such decreases in the activity of enveloped viruses can be on the order of about 3 log reduction factor (LRF) preferably of about 4 LRF, more preferably of about 5 LRF, even more preferably of about 6 LRF.

Any one or more of a variety of methods of viral inactivation can be used including heat inactivation (pasteurization), pH inactivation, solvent/detergent treatment, UV and γ-ray irradiation and the addition of certain chemical inactivating agents such as β-propiolactone or e.g., copper phenanthroline as in U.S. Pat. No. 4,534,972, the entire teaching of which is incorporated herein by reference.

Methods of pH viral inactivation include, but are not limited to, incubating the mixture for a period of time at low pH, and subsequently neutralizing the pH. In certain embodiments the mixture will be incubated at a pH of between about 2 and 5, preferably at a pH of between about 3 and 4, and more preferably at a pH of about 3.6.

The pH of the sample mixture may be lowered by any suitable acid including, but not limited to, citric acid, acetic acid, caprylic acid, or other suitable acids. The choice of pH level largely depends on the stability profile of the antibody product and buffer components. It is known that the quality of the target antibody during low pH virus inactivation is affected by pH and the duration of the low pH incubation. In certain embodiments the duration of the low pH incubation will be from 0.5 hr to 2 hr, preferably 0.5 hr to 1.5 hr, and more preferably the duration will be about 1 hr. Virus inactivation is dependent on these same parameters in addition to protein concentration, which may limit inactivation at high concentrations.

Thus, the proper parameters of protein concentration, pH, and duration of inactivation can be selected to achieve the desired level of viral inactivation.

In certain embodiments viral filtration is performed. This can be achieved via the use of suitable filters. A non-limiting example of a suitable filter is the Ultipor DV50™ filter from Pall Corporation. In certain embodiments, alternative filters are employed for viral inactivation, such as, but not limited to, Sartorius filters, Viresolve™ filters (Millipore, Billerica, Mass.); Zeta Plus VR™ filters (CUNO; Meriden, Conn.); and Planova™ filters (Asahi Kasci Pharma, Planova Division, Buffalo Grove, 111).

Ultrafiltration is described in detail in: Microfiltration and Ultrafiltration: Principles and Applications, L. Zeman and A. Zydney (Marcel Dekker, Inc., New York, N.Y., 1996); and in: Ultrafiltration Handbook, Munir Cheryan (Technomic Publishing, 1986; ISBN No. 87762-456-9). A preferred filtration process is Tangential Flow Filtration as described in the Millipore catalogue entitled "Pharmaceutical Process Filtration Catalogue" pp. 177-202 (Bedford, Mass., 1995/96). Ultrafiltration is generally considered to mean filtration using filters with a pore size that allow transfer of protein with average size of 50 kDa (for example) or smaller. By employing filters having such small pore size, the volume of the sample can be reduced through permeation of the sample buffer through the filter while antibodies are retained behind the filter.

Diafiltration is a method of using ultrafilters to remove and exchange salts, sugars, and non-aqueous solvents, to separate free from bound species, to remove low molecular-weight material, and/or to cause the rapid change of ionic and/or pH environments. Microsolutes are removed most efficiently by adding solvent to the solution being ultrafiltered at a rate approximately equal to the ultratfiltration rate. This washes microspecies from the solution at a constant volume, effectively purifying the retained antibody. In certain embodiments of the present invention, a diafiltration step is employed to exchange the various buffers used in connection with the instant invention, optionally prior to further chromatography or other purification steps, as well as to remove impurities from the antibody.

In one embodiment, the antibody which is isolated is crystallized.

As used herein the term "crystallizing" refers to the solidification of the molecule of interest so as to form a regularly repeating internal arrangement of its atoms and often external plane faces.

Several crystallization approaches which are known in the art can be applied to the sample in order to facilitate crystallization of the molecule of interest. Examples of crystallization approaches include, but are not limited to, the free interface diffusion method [Salemme, F. R. (1972) Arch. Biochem. Biophys. 151:533-539], vapor diffusion in the hanging or sitting drop method (McPherson, A. (1982) Preparation and Analysis of Protein Crystals, John Wiley and Son, New York, pp 82-127), and liquid dialysis (Bailey, K. (1940) Nature 145:934-935).

Presently, the hanging drop method is the most commonly used method for growing macromolecular crystals from solution; this approach is especially suitable for generating protein crystals. Typically, a droplet containing a protein solution is spotted on a cover slip and suspended in a sealed chamber that contains a reservoir with a higher concentration of precipitating agent. Over time, the solution in the droplet equilibrates with the reservoir by diffusing water vapor from the droplet, thereby slowly increasing the concentration of the protein and precipitating agent within the droplet, which in turn results in precipitation or crystallization of the protein.

According to another aspect of the present invention there is provided a method of isolating an antibody, the method comprising contacting an aggregate comprising a hydrophobic chelator (as described herein below) which has been solubilized in a non-volatile, water miscible organic solvent, at least one non-ionic detergent and metal ions with a liquid sample comprising the antibody under conditions that allow partitioning of the antibody into the aggregate, thereby isolating the antibody.

Hydrophobic chelators, non-ionic detergents and metal ions have been described herein above.

Optionally, non-detergent, hydrophobic agents are also used to fabricate the aggregate as further described herein above.

Conditions used for generating the aggregate and further isolation steps have also been described herein above.

The agents used for purifying the antibody may be provided as a kit.

Thus, according to another aspect of the present invention there is provided a kit comprising a hydrophobic chelator, a metal salt and at least two non-ionic detergents, wherein a first of the at least two non-ionic detergents comprises polysorbate 20 or BRIJ-020™, a second of the at least two non-ionic detergents comprises DDM.

According to still another aspect there is provided a kit comprising a hydrophobic chelator, a non-detergent, hydrophobic agent, a metal salt and at least one non-ionic detergent.

Each of the components of the kit have been described herein above with respect to the method of purifying the antibody.

The kit may be accompanied by instructions for use. The components of the kit are typically packaged separately.

It is expected that during the life of a patent maturing from this application many relevant hydrophobic chelators will be developed and the scope of the term hydrophobic chelator is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated herein above and as claimed in the claims section below find experimental support in the following examples.

EXAMPLES

Reference is now made to the following examples, which together with the above descriptions illustrate some embodiments of the invention in a non limiting fashion. Generally, the nomenclature used herein and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994); "Culture of Animal Cells—A Manual of Basic Technique" by Freshney, Wiley-Liss, N. Y. (1994), Third Edition; "Current Protocols in Immunology" Volumes I-III Coligan J. E., ed. (1994); Stites et al. (eds), "Basic and Clinical Immunology" (8th Edition), Appleton & Lange, Norwalk, CT (1994); Mishell and Shiigi (eds), "Selected Methods in Cellular Immunology", W. H. Freeman and Co., New York (1980); available immunoassays are extensively described in the patent and scientific literature, see, for example, U.S. Pat. Nos. 3,791,932; 3,839,153; 3,850,752; 3,850,578; 3,853,987; 3,867,517; 3,879,262; 3,901,654; 3,935,074; 3,984,533; 3,996,345; 4,034,074; 4,098,876; 4,879,219; 5,011,771 and 5,281,521; "Oligonucleotide Synthesis" Gait, M. J., ed. (1984); "Nucleic Acid Hybridization" Hames, B. D., and Higgins S. J., eds. (1985); "Transcription and Translation" Hames, B. D., and Higgins S. J., eds. (1984); "Animal Cell Culture" Freshney, R. I., ed. (1986); "Immobilized Cells and Enzymes" IRL Press, (1986); "A Practical Guide to Molecular Cloning" Perbal, B., (1984) and "Methods in Enzymology" Vol. 1-317, Academic Press; "PCR Protocols: A Guide To Methods And Applications", Academic Press, San Diego, CA (1990); Marshak et al., "Strategies for Protein Purification and Characterization—A Laboratory Course Manual" CSHL Press (1996); all of which are incorporated by reference as if fully set forth herein. Other general references are provided throughout this document. The procedures therein are believed to be well known in the art and are provided for the convenience of the reader. All the information contained therein is incorporated herein by reference.

Example 1

Detergent Aggregates Containing Hydrophobic Amino-Acids Enhances Purification of IgG's, IgM's and Albumins Near or at Neutral pH Materials Bovine serum albumin (Sigma, A7906), iron (II) sulfate heptahydrate (Sigma, F7002), sodium chloride (Sigma, S7653), BRIJ™ O-20 (Sigma, 436240), Ex-CELL 610-HSF medium (Sigma, 14610C), glycine (Bio-lab 07132391), bathophenanthroline (GFS chemicals, C038446), human IgG (Lee-Biosicences, 340-21), bovine IgM (Sigma, 18135), Phenylalanine (Sigma, P2126), Tyrosine (Sigma, T3754), Tryptophan (Sigma, T3300), Isoleucine (Sigma, I2752), Valine (Sigma, 94640).

Aggregate Preparation
1. solubilize bathophenanthroline (BP) in DMSO-HCl;
2. solubilize phenylalanine in DMSO-HCl;
3. combine 1 and 2 with BRIJ™-O20;
3. Add $FeSO_4$ in 20 mM NaCl; and
4. centrifuge and discard supernatant, keep pellet.

IgG Capture:
1. obtain sample of clarified cell culture containing the target IgG and 4% PEG-6000;
2. suspend the pellet in the culture, incubate at room temperature, centrifuge and discard.

IgG Extraction:
1. Resuspend the washed pellet with 200 µl of 50 mM Gly in 30 mM NaCl at pH 3.8 or, 200 mM Tris pH 6.35 in 50 mM NaCl or 100 mM Tris pH 7 in 50 mM NaCl.
2. Incubate at room temperature, centrifuge and collect supernatant.
3. Neutralize the extracted IgM preparation with Tris.

For capture and release of IgM, the same protocol was applied.

For capture and release of BSA, the same protocol was applied except for the addition of 0.1-10 mM octanoic acid.

Results

Figure 1:
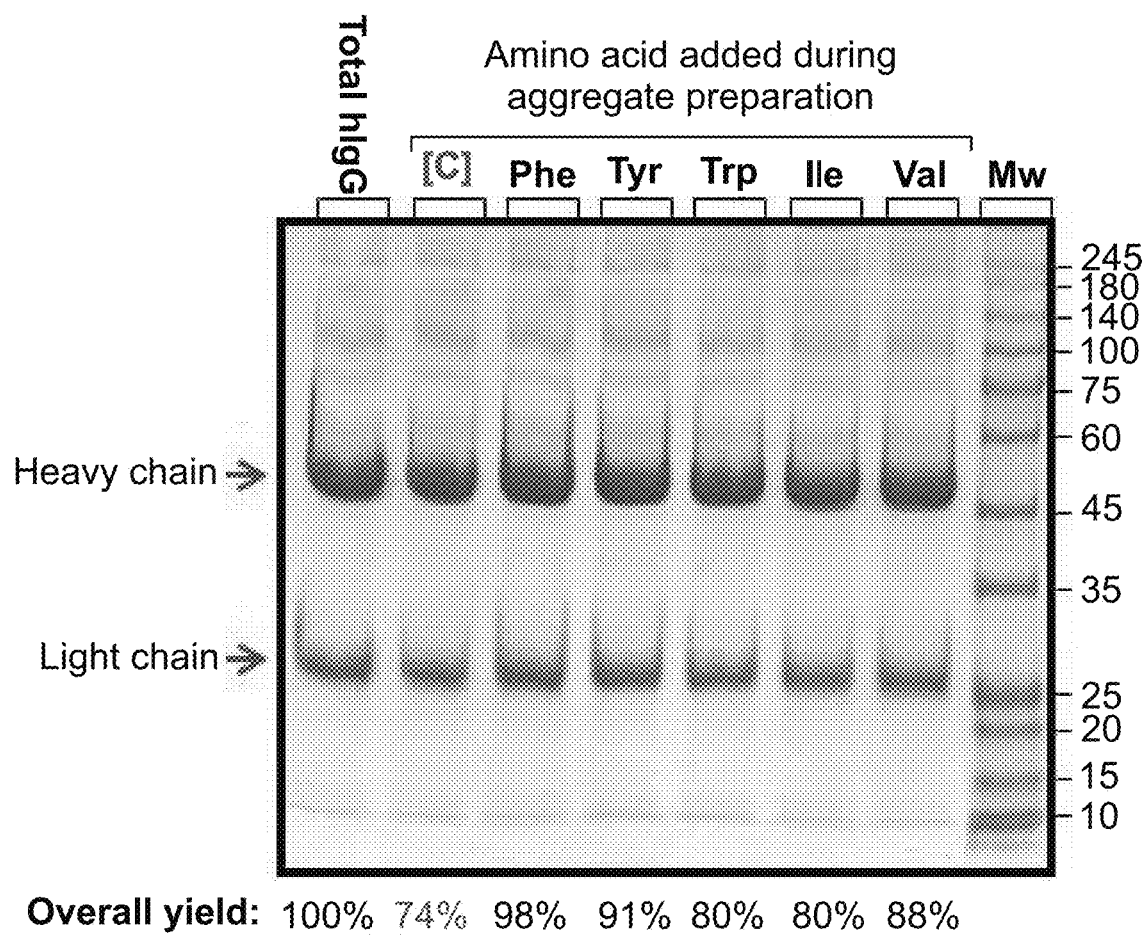
FIG. 1. Purification of human IgG (hIgG) when extracted at pH 4 with or without supplemented hydrophobic amino acids during aggregate preparation. Detergent aggregates comprised of: BRIJ™-O20 as the detergent, [(bathophenanthroline)$_3$: Fe$^{2+}$] as the amphiphilic complex and indicated amino acids (added during aggregate preparation) were incubated with hIgG (at 5 mg\mL) as described in the Experimental section. Red arrows point at the reduced heavy and light chains of the antibody. Overall yields were determined by densitometry using the ImageJ program. The lane marked [C] is a control sample in the absence of hydrophobic amino acid. Mw-molecular weight protein markers. The gel is Coomassie stained.
Figure 2A:
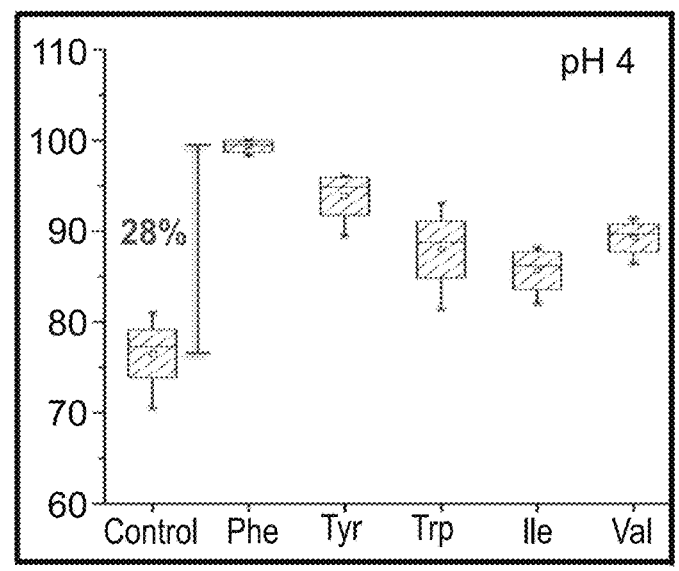
FIGS. 2A-C. Overall recovery yields of hIgG when extracted at indicated pH values with and without indicated amino acids added during aggregate formation. The target: hIgG at 5 mg\mL was captured and extracted from detergent aggregates composed of: BRIJ™-O20 as the detergent, [(batho)$_3$: Fe$^{2+}$] as the amphiphilic complex and indicated amino acids. Red vertical bars on the left-hand side, represent the relative improvement in comparison to the same aggregate devoid of added amino acid. Values represent at least 4 independent experiments conducted at different days.
Figure 2B:
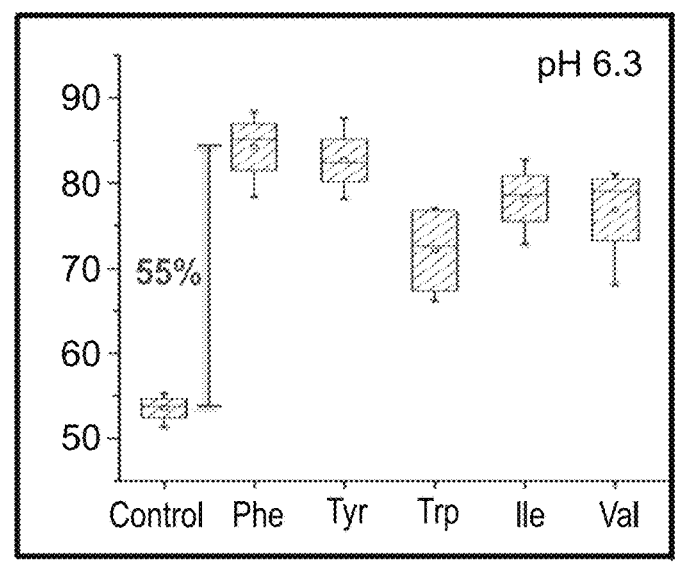
Figure 2C:
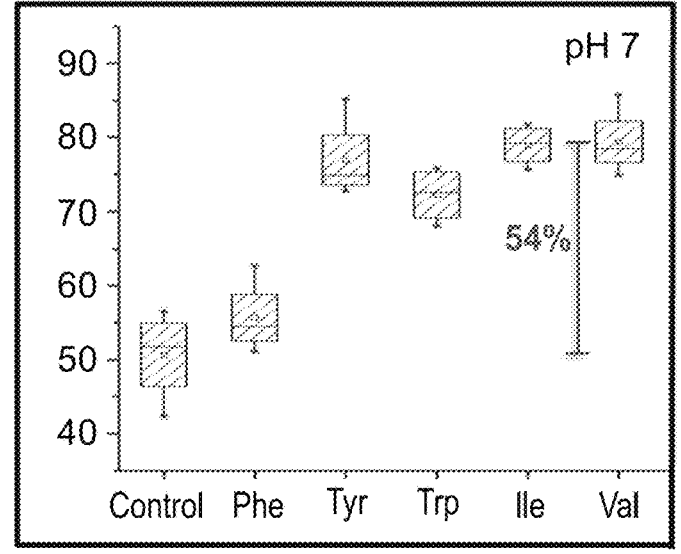

The efficiency of IgG purification is demonstrated in FIG. 1 (at pH4) and in FIG. 2A-C (at pH 6.3 and 7). The efficiency of IgM purification at neutral pH is demonstrated in FIG. 3.

Figure 4:
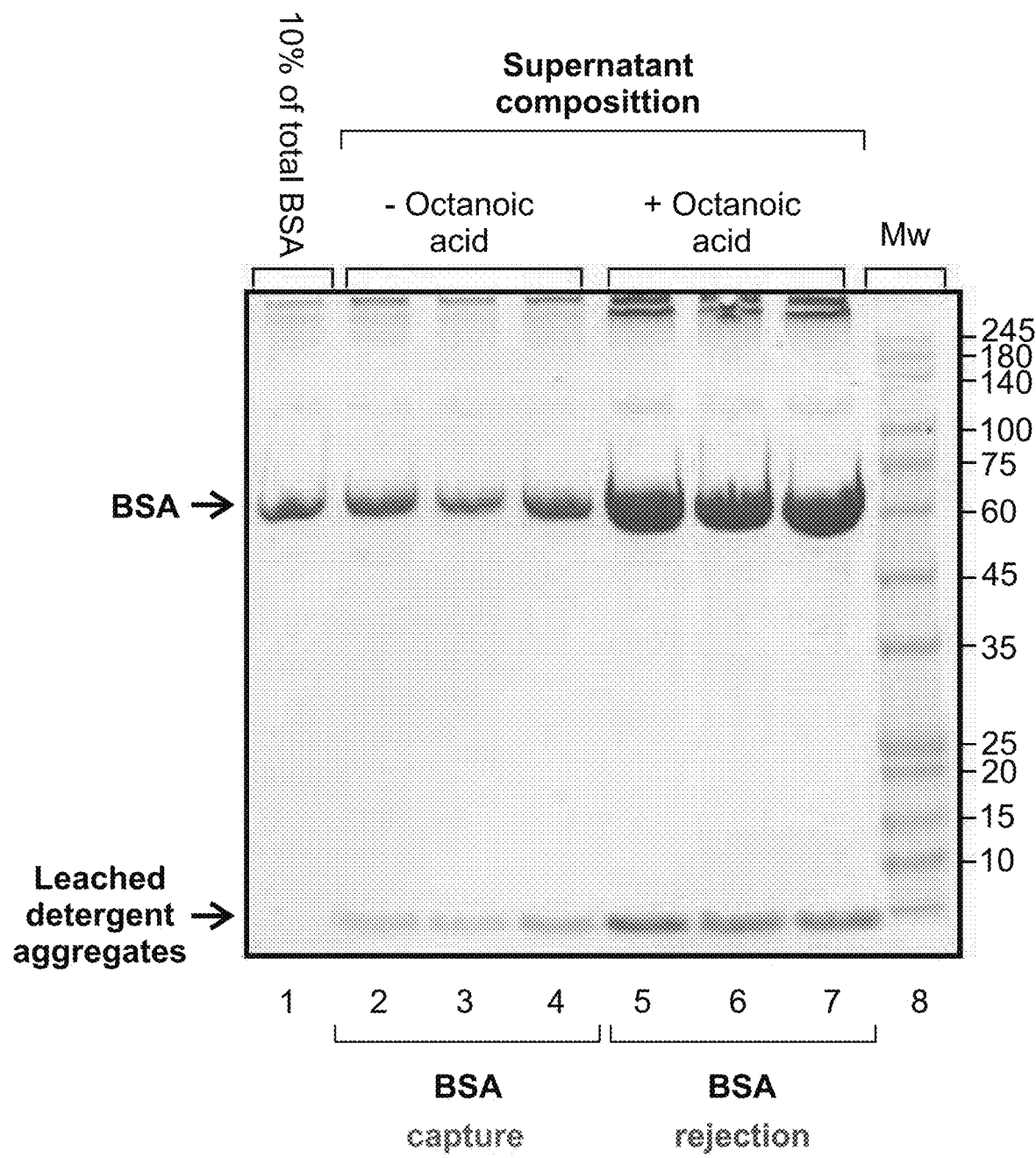
FIG. 4. Adsorption and repulsion of BSA from BRIJ™-O20 detergent aggregates. Lane 1: 10% of total BSA present during the binding step; lanes 2-4 and 5-7: supernatant composition, after incubating BSA (4 mg\mL) for 10 minutes at 25° C. with Brij™-O20 aggregate devoid or with octanoic acid, respectively. Arrows point at the BSA and detergent aggregates bands. The gel represents 6 independent experiments and is Coomassie stained.

FIG. 4 illustrates that the addition of a negatively charged detergent (octanoic acid) to the aggregate decreased the retention of BSA thereto.

Example 2

Isolation of IgM Using Two Non-Ionic Detergents

Materials

Polysorbate 20 (TWEEN™-20) (Sigma, 44112)

BRIJ™-O20 (Sigma, 436240)

TRITON™ X-100 (Sigma, T8787)
Decylamine (Sigma, D2404)
Octanoic acid (Sigma, C2875)
Bathophenanthroline (the chelator) was purchased from: GFS chemicals, C038446, Columbus, Ohio, USA
Dodecyl maltoside (DDM) also called: n-Dodecy-beta-D-maltoside was purchased from Carbosynth UK (cat. 69227-93-6).

Methods

IgM Purification Via Tween-20 & DDM/OG/Decanoic Acid Aggregates

Aggregate Preparation
1. solubilize bathophenanthroline (BP) in DMSO-HCl;
2. prepare aggregate by adding the solubilized BP to Tween 20 and DDM/OG/decanoic acid;
3. Add $FeCl_2$ in 20 mM NaCl; and
4. centrifuge and discard supernatant, keep pellet.

IgM Capture:
1. obtain sample of clarified cell culture containing the target IgM and 6% PEG-6000.
2. suspend the pellet in the culture, incubate at room temperature, centrifuge and discard supernatant.
3. Wash in cold 20 mM NaCl.

IgM Extraction:
1. Resuspend the washed pellet with 80 µl of 50 mM Gly in 50 mM NaCl at pH 3.0.
2. Incubate at room temperature, centrifuge and collect supernatant.
3. Neutralize the extracted IgM preparation with Tris.

Results

The positive effect of using a second detergent in the purification of antibodies is illustrated in FIGS. 6A-D, 7 and 8.

Example 3

Extraction of IgM at pH 6.3

Materials and Methods: Purification of either human or bovine IgMs was performed on the 100 µl scale. Freshly prepared detergent aggregates (Tween-20 micelles with the [(bathophenanthroline)$_3$:Fe$^{2+}$] complexes together with leucine, isoleucine, valine, phenylalanine, or tyrosine) were resuspended in 20 µl of serum-free medium (Ex-CELL, 610-HSF), 60 µl of the target IgM (1 mg/ml), and 20 µl of 30% of PEG-6000. After 10 min of incubation at 25° C., the mixture was centrifuged (21,000 g for 5 min), the supernatant was discarded, and pellets were briefly washed with 30 µl of cold 20 mM NaCl. An additional identical centrifugation step followed, the supernatant was removed, and the remaining pellet was subjected to extraction conditions. Washed pellets were resuspended with in 200 mM Tris (at pH 6.3) in 30 mM NaCl was used.

Results

Figure 11:
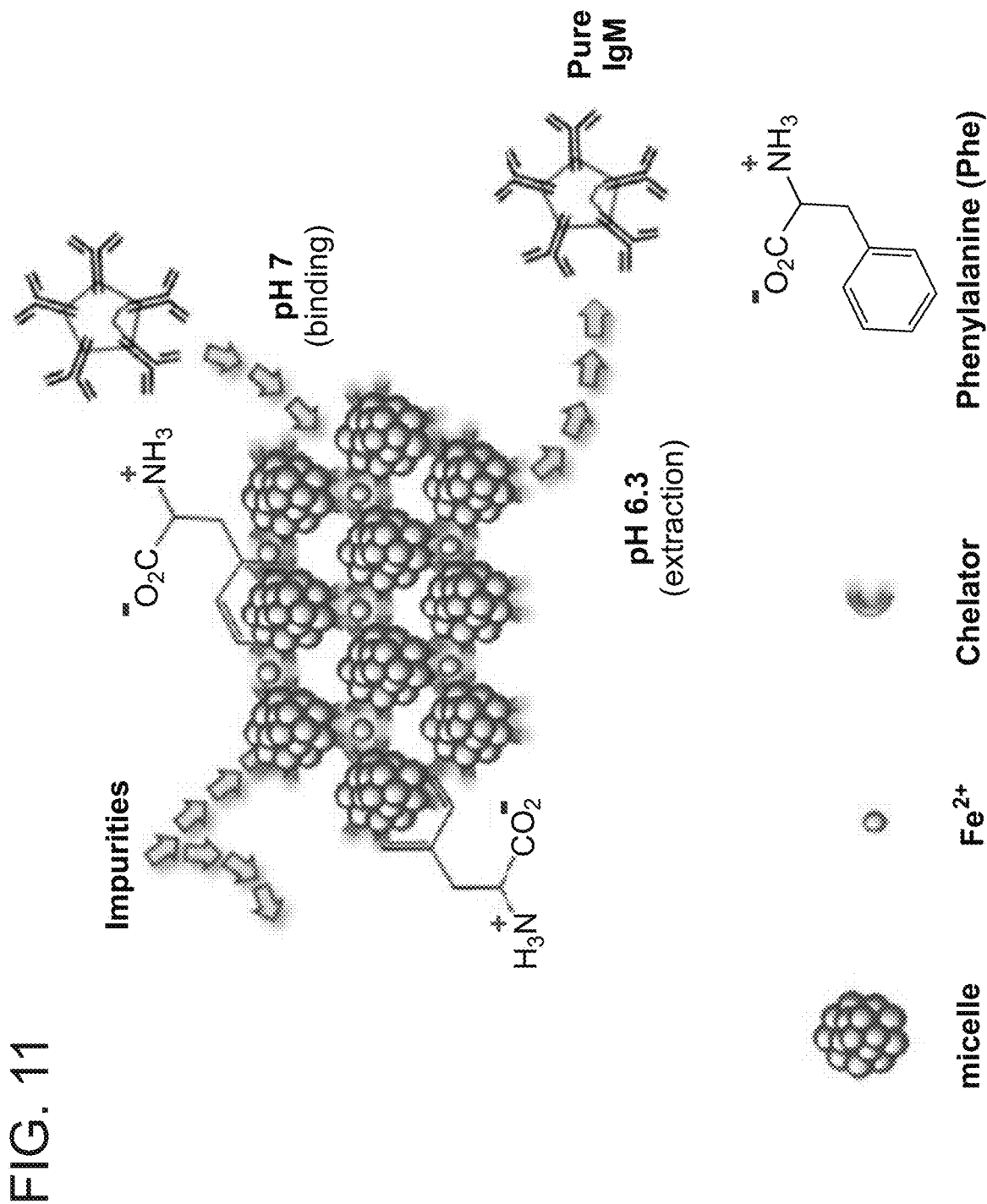
FIG. 11. Extraction of IgM at pH 6.3. Aggregates containing Tween-20, the [(bathophenanthroline)$_3$:Fe$^{2+}$] amphiphilic complex, and Phe as a platform for IgM capture and extraction.
Figure 12A:
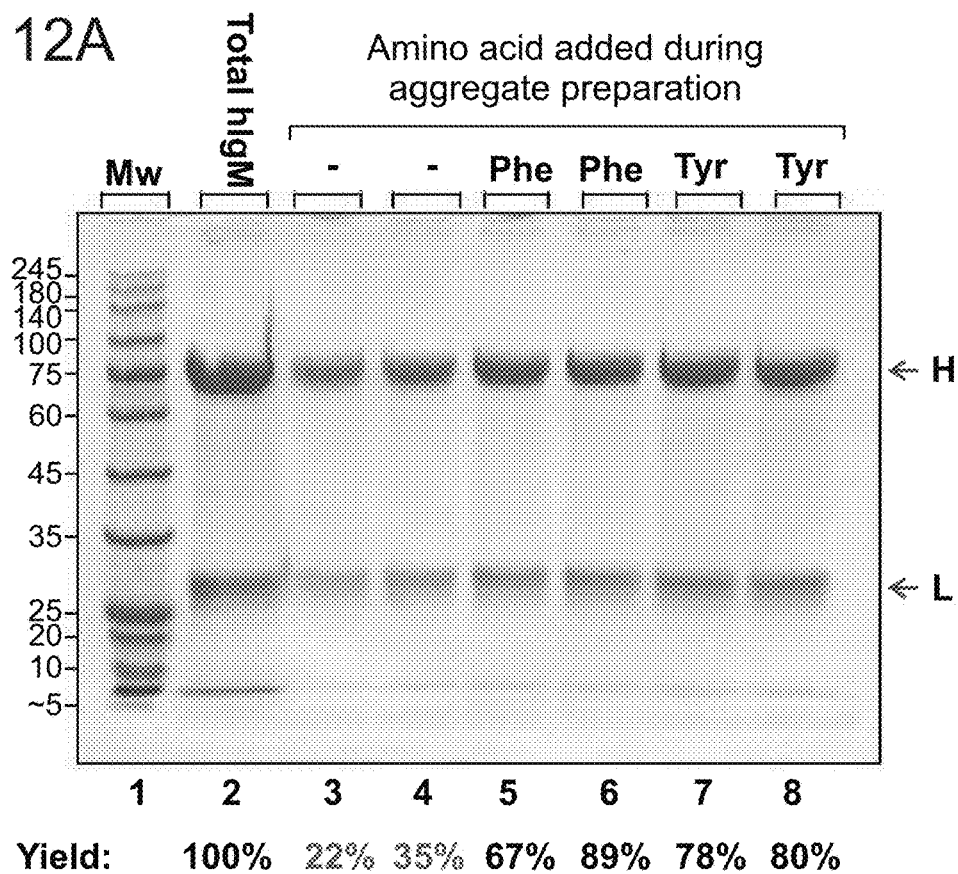
FIGS. 12A-B. Effect of hydrophobic amino acid addition on IgM purification. Tween-20 aggregates were prepared with or without the addition of aromatic or aliphatic amino acids. These additions were necessary to capture bovine IgM at pH 7 and to extract the antibody at pH 6.3. Lane 1—molecular weight (MW) markers; lane 2: total IgM present; lanes 3-4, 5-6 and 7-8 quantitate recovered IgM. Overall process yields shown below the gels were calculated by densitometry using the ImageJ (NIH) program. Gels are Coomassie stained.
Figure 12B:
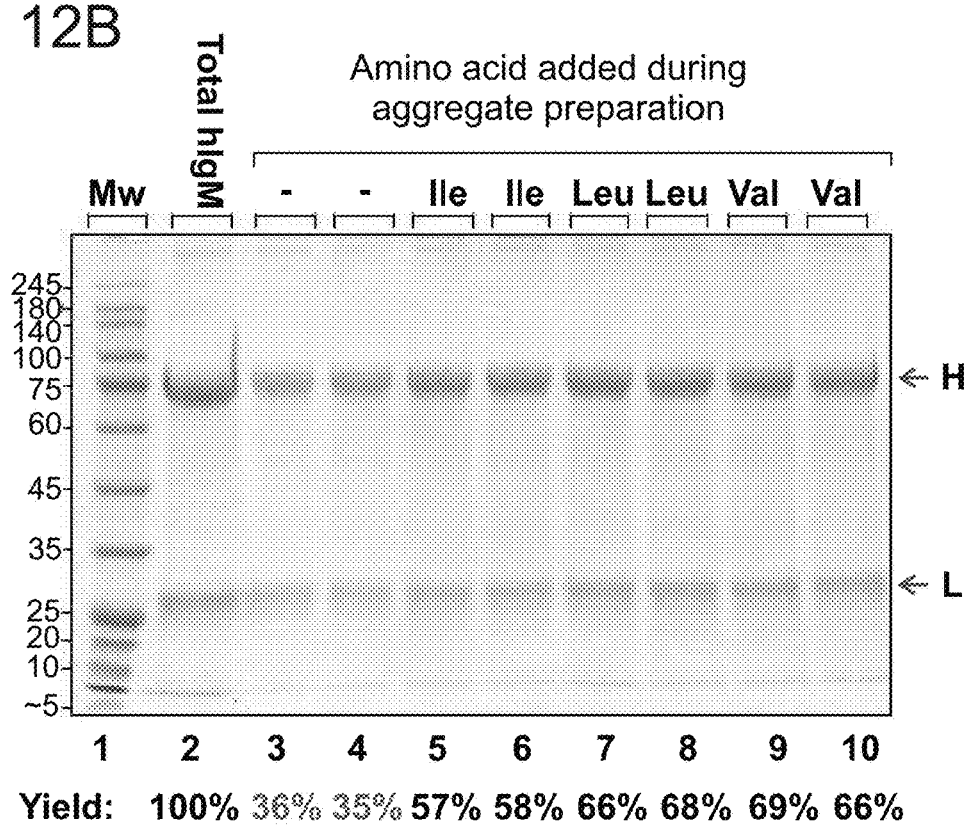
Figure 13:
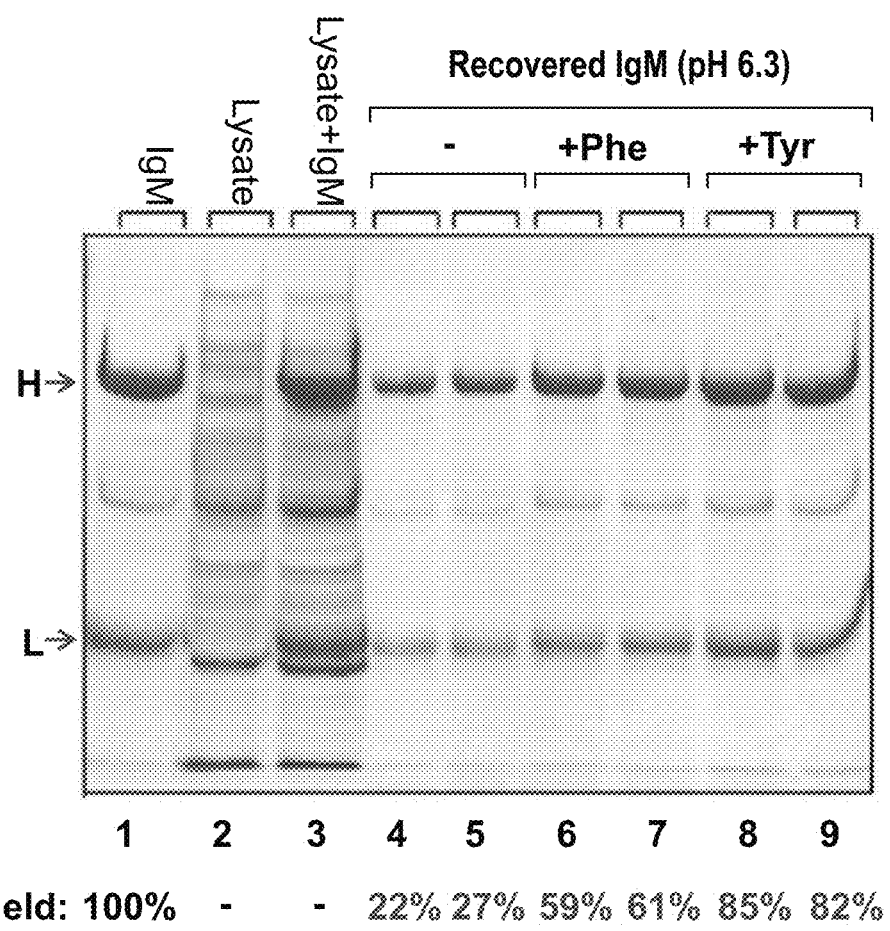
FIG. 13 is a photograph of a Coomassie-stained following extraction at pH 6.3. Lanes 1-3: total IgM; total Escherichia coli lysate; or both, respectively; lanes: 4-5, 7-8, and 9-10- IgM recovered from Tween-20 aggregates containing the [(bathophenanthroline)$_3$:Fe$^{2+}$] amphiphilic complex with or without Phe or Tyr added during aggregate preparation. Overall process yields shown below the gel were calculated by densitometry using the ImageJ (NIH) program. CD, circular dichroism; DDM, dodecyl β-D-maltopyranoside; DLS, dynamic light scattering; H, L, heavy and light chains; IgM, immunoglobulin M; Phe, phenylalanine; SDS, sodium dodecyl sulfate-polyacrylamide gel electrophoresis; Tyr, tyrosine.
Figures 14A, 14B:
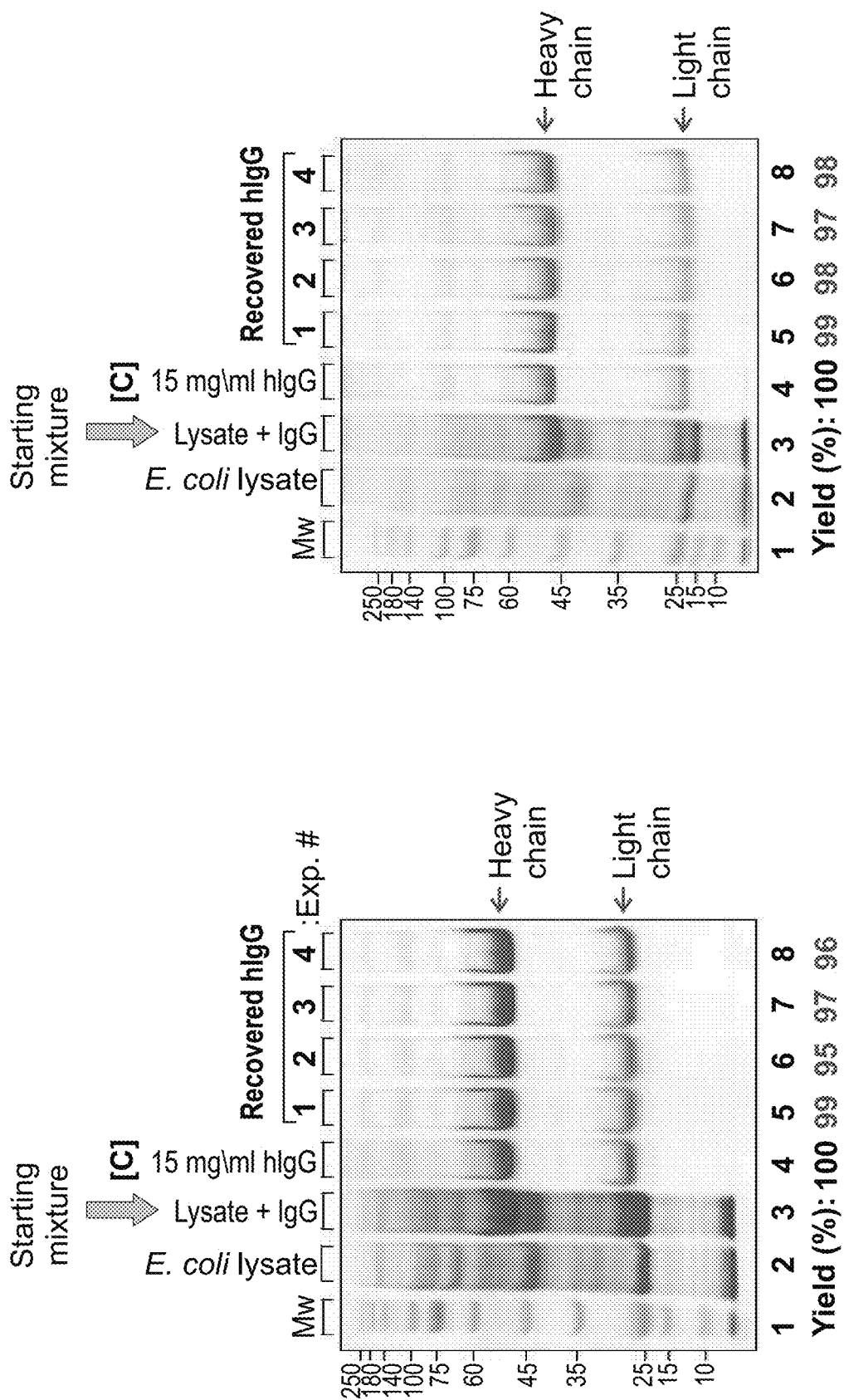
FIGS. 14A-D. Purification of human IgG (hIgG) at 15 mg\mL. The target hIgG is captured by, and extracted from, detergent aggregates comprised of: DDM, Tyr, indicated non-ionic detergents and the [(bathophenanathroline)$_3$:Fe$^{2+}$] amphiphilic complex. Lane 1: Molecular weight markers; lane 2; 50% of the total amount of E. coli. lysate added as an artificial contamination background; lane 3: as in lane 2 together with the total amount of hIgG; lane 4: total amount of the commercial pure hIgG (≥95% pure) that was not subjected to the purification process; lanes 5-8: hIgG recovered at pH 6.5 via conjugated micelles in 4 independent experiments performed in different days. Overall process yields are specified below relevant lanes. The gel is Coomassic stained.
Figures 14C, 14D:
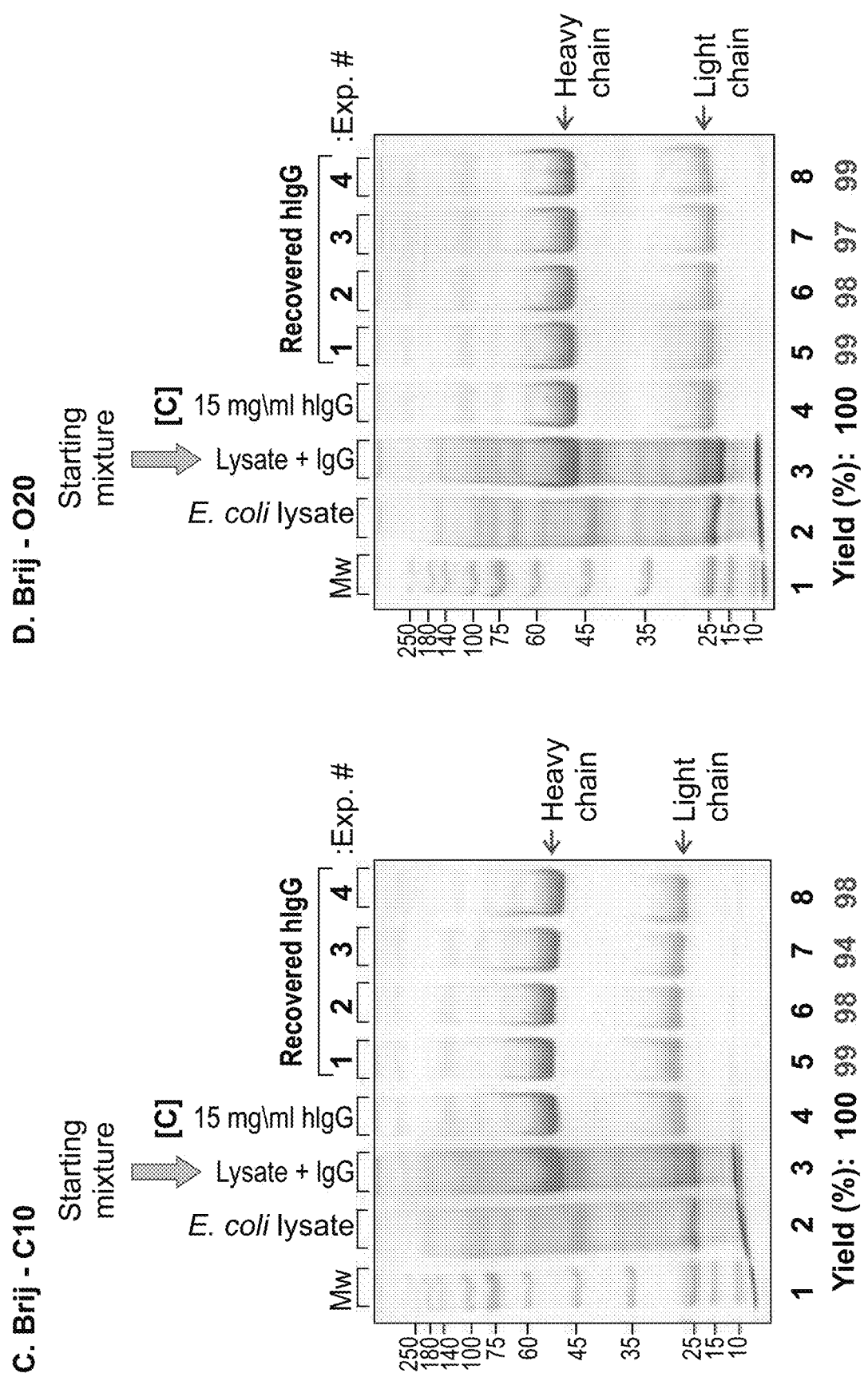

Since some IgMs undergo denaturation and aggregation at very low pH (Hennicke et al., 2017) extraction of IgMs was also studied at pH 6.3 (FIG. 11). Achieving this goal required the preparation of conjugated detergent micellar aggregates with which captured IgMs would interact more weakly, and hence, a fundamental change in the aggregate chemical composition was essential. It was found that the inclusion of either leucine, isoleucine, valine, phenylalanine, or tyrosine during conjugation of Tween-20 micelles with the [(bathophenanthroline)$_3$:Fe$^{2+}$] complexes and the formation of detergent aggregates significantly improved the extraction efficiency of bovine IgMs at pH 6.3 (FIG. 12A,B). Best overall yields (~80%) were observed when tyrosine was present (FIG. 12A, lanes 7 and 8). Repetition of the latter with *E. coli* lysate as contaminating background (FIG. 13) gave similar results (FIG. 13, lanes 8 and 9).

Example 4

Extraction of IgM at pH 6.3

Materials and Methods:

Preparation of 200 mM bathophenanthroline:DMSO:HCl solution: Into 90 µL of dimethyl sulfoxide (DMSO) and 10 µL of 25% HCl, 6.64 mg of bathophenanthroline are added and vortexed for 5 minutes until total dissolution is observed.

Preparation of 200 mM Tyrosine:DMSO:HCl solution: Into 92.5 µL of dimethyl sulfoxide (DMSO) and 7.5 µL of 25% HCl, 3.6 mg of Tyrosine (Tyr) are added and vortexed for 5 minutes until total dissolution is observed.

25 mg/mL of hIgG Purification at 5 mL Scale Using Tween-40 Aggregates:

Step I: Aggregate preparation: Detergent aggregates were obtained by mixing of medium A and B as follows: medium A was prepared by the addition of 980 µL of DDM (30 mM in DDW), 495 µl of phenylalanine (200 mM in DMSO\HCl), the hydrophobic chelator bathophenanthroline (200 mM in DMSO\HCl) with 6.65 mL of: 0.7 mM Tween-40 in DDW. Then, 6.65 mL of medium B containing 4 mM $FeCl_2$ in 20 mM NaCl was then added to medium A with vigorous vortexing and further incubated for 5 minutes at 25° C. This was followed by the addition of 440 µL of 5M NaCl and incubation for 5 additional minutes at 25° C. Centrifugation (21,000×g, 5 minutes at 19° C.) was applied, and the supernatant was removed from the resulting red pellet. The red pellet was washed once with 300 µL of cold 20 mM NaCl and centrifugation was repeated (21,000×g, 5 minutes at 19° C.

Step II: hIgG capture: Freshly prepared aggregates were resuspended in 825 µL of serum-free medium (Ex-CELL 610-HSF), 1.67 mL of 30% PEG-6000 and the 2.5 mL of target hIgG (30 mg/mL). The mixture was suspended thoroughly & vortexed vigorously for 2 mins. and after 30 minutes of incubation at room temperature, centrifugation (21,000×g, 5 minutes, 19° C.) was applied. The supernatant discarded and pellets were briefly washed with 300 µL of cold 20 mM NaCl. An additional centrifugation step followed (21,000×g, 5 minutes) and the supernatant was excluded.

Step III: hIgG extraction: Detergent aggregates containing the target IgG were recovered through three sequential extractions, each follows various volumes (5 mL, 1.25 mL & 1 mL) of 100 mM NaPi pH 6.5, 400 mM NaCl. The aggregates were suspended and incubated for 30 minutes at 25° C. for each extraction. The followed, centrifugation were applied (21,000×g, 5 minutes). The supernatant was collected and analyzed by SDS-PAGE.

Sodium dodecyl sulfate polyacrylamide gel electrophoresis (SDS-PAGE): Recovered hIgG was mixed with sample buffer (4×) containing β-mercaptoethanol and boiled for 5 minutes at 95° C. Aliquots (20 µL) were loaded on a 10% bis-Tris SDS-poly-acrylamide gel (1 mm thickness) for 90 minutes at constant 120V. All gels were stained with Coomassie Brilliant Blue G-250. Bands present in Coomassie stained gels were quantified using the ImageJ (NIH) standalone version 1.51k.

Dynamic light scattering (DLS): DLS measurements were performed by comparing commercially pure (>95%) hIgG (1 mg/mL) that never encountered any detergent with those subjected to the capturing and eluting steps in the presence of different {Tween-40: DDM:

Tyr [(bathophenanthroline)$_3$:Fe$^{2+}$]} aggregates. All hIgG's samples were first solubilized in 400 mM NaPi pH 6.5 and then diluted to 1 mg\mL with 50 mM NaCl. Samples were centrifuged at 21,000×g for 30 minutes prior to analysis. The intensity-weighted size distributions of hIgG was determined using the auto correlation spectroscopy protocol of the Nanophox instrument (Sympatec GmbH, Clausthal-Zellerfeld, Germany).

Densitometry: Bands present in Coomassie-stained gels were quantified using the EZQuant program. Process yield was calculated by comparing the intensity of bands representing a known amount of commercial calibrated, pure IgG to the extracted target antibody at the end of the purification process.

Results

To present a potentially realistic purification platform for high Ab titers that are currently achieved by, many biotech companies, the present inventors tested the above non-chromatographic ligand-free strategy at high IgG concentrations (15-25 mg\mL), using a variety of non-ionic detergents (i.e., Tween-20, -40, -60, -80, Brij-C10, —O20, S100) and limited themselves to pH values close to neutrality (i.e., pH 6.5-7) to circumvent Ab aggregation.

A commercially available human IgG (hIgG) at 15 mg\mL served as the model system. The latter was captured at pH 7 by conjugated-micelles containing in addition to a detergent of choice and the [(bathophenanthroline)$_3$:Fe$^{2+}$] amphiphilic complex, a second non-ionic detergent (i.e., dodecyl maltoside, DDM) and the amino acid: Tyrosine (Tyr).

These additional additives added during preparation of conjugated-micelles are assumed to embed themselves into the micellar aggregate and direct their sugar moiety (in the case of DDM) and zwitterionic group (in the case of Tyr) towards the aqueous phase thereby increasing the hydrophilic character of the conjugated-micelles. This in turn, weakens the interaction of the detergent matrix with the IgGs (or IgMs) and allow their recovery by extraction at close to neutrality (pH 6.3-6.5) without parallel coextraction of impurities or significant micellar dissolution.

Accordingly, spike-and-recovery experiments were conducted with hIgG (at 15 mg\mL) mixed with an artificial contamination background composed of *E. coli* lysate (FIG. 14A-D). The initial hIgG\lysate mixtures are shown in FIGS. 14A-D, lanes 3 and the recovered hIgG is presented in FIGS. 14A-D lanes 5-8.

Process yields with Tween-80, Tween-40, Brij-C10 and Brij-O20 and were high (94-99%) and seemed not to be affected by the detergent used. Moreover, it became clear that the capturing step at pH 7 was quantitative with all aforementioned surfactants, explaining the observed high process efficiency.

The purity of the recovered hIgG was encouraging as no significant differences were observed between the commercial control hIgG (purity ≥95%) that was not subjected to any manipulation with the hIgG that was subjected to the described purification approach (FIG. 14A-D, lanes 5-8). Very similar yield and purity were also found with Tween-20, Tween-60 and Brij-S100.

Figure 15A:
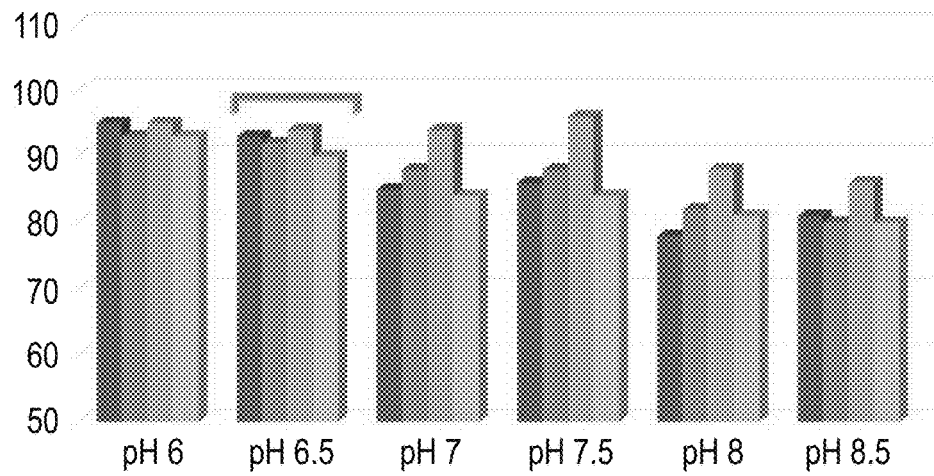
FIGS. 15A-C. Effect of extraction pH (A); Tyrosine concentration (B) and (C) the secondary detergent concentration (i.e., DDM) concentration on process yield in the presence of Tween-40 and the [(bathophenanthroline)$_3$:Fe$^{2+}$] amphiphilic complex. Each colored column represents an independent purification trial at the 0.1 mL scale, performed on different days. Green brackets represent optimal conditions.

In an attempt to define the range of conditions that would provide optimal results, the impact of the: extraction pH (FIG. 15A); the concentration of Tyr (FIG. 15B) and that of DDM (FIG. 15C) on process efficiency was studied. Optimal extraction pH was found to range between 6-6.5 whereas at higher pH values (i.e., pH 7-8.5) process yields gradually decreased (FIG. 15A). This trend could be explained\rationalized by considering the isoelectric points (pI) of hIgG and Tyr. Whereas the pI of the hIgG population ranges between pH 6.3-8.9 the pI of Tyr is 5.7. Therefore, at pH 7 and above, an increasing amount of IgGs would be possess a net negative charge that would be repelled by the net negative charge of the Tyr moiety present in the detergent scaffold. This would explain the weaker (or no) binding of the antibodies during the capturing step and hence, overall lower yields.

Figure 15B:
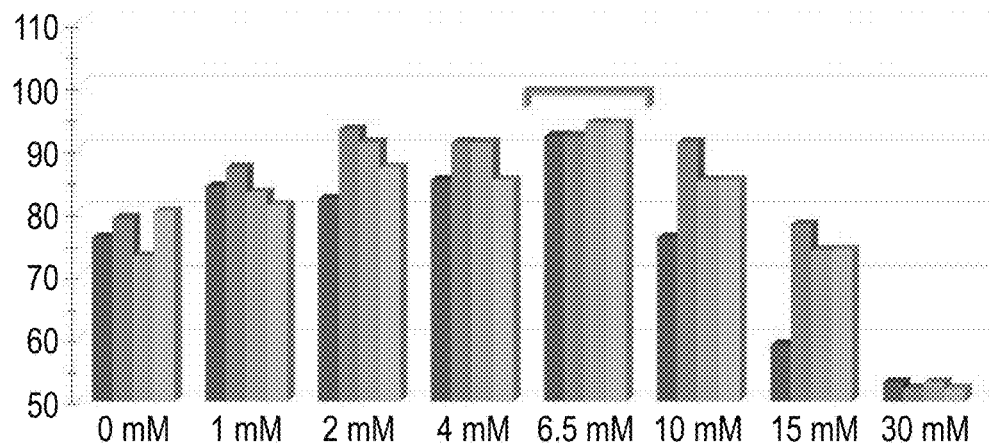

The contribution of Tyr for process efficiency was clearly observed. In the optimal extraction pH (i.e., 6.5) but absence of Tyr, extraction yields were good (~75%) but far from quantitative whereas in the presence of 6.5 mM Tyr, extraction yields were generally >90% (FIG. 15B). This finding implies that introduction of Tyr together with its zwitterionic group into the micellar matrix, reduced the hydrophobic character of the surfactant matrix and made it more polar. This in turn, weakened the binding affinity of captured hIgGs with its surrounding detergent scaffold and allow more efficient extraction at pH 6.5.

Figure 15C:
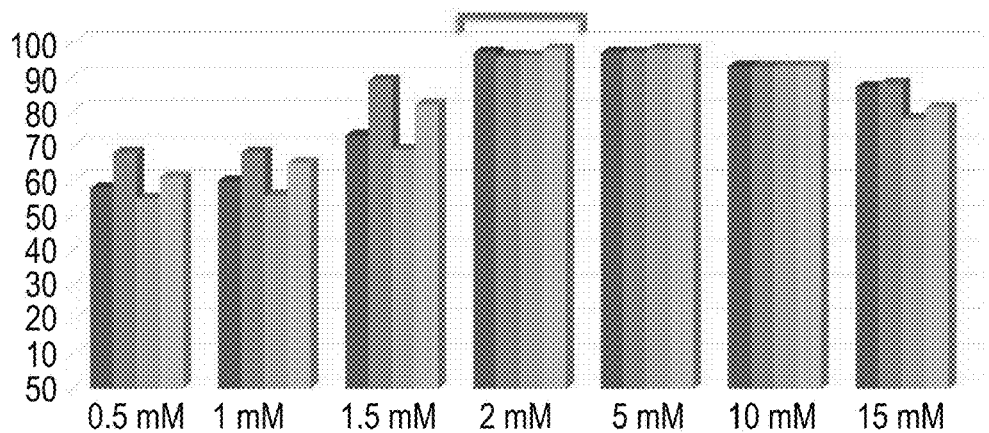

An even greater effect was found when DDM was added during micellar conjugation. In the absence of added DDM, process yields were low (~60%) even when the ideal pH (i.e., pH 6.5) and optimal Try concentration (i.e., 6.5 mM) were used. However, inclusion of 2-10 mM of DDM during micellar conjugation improved process efficiency significantly and reached >90% yield (FIG. 15C).

Thus, it seems that introduction of the maltose (i.e., disaccharide) headgroup of DDM increases the hydrophilic character of the detergent matrix which in turn, weakens the interactions with captured IgGs and this translates into greater extraction yields under mild conditions (i.e., pH 6.5).

Figure 16B:
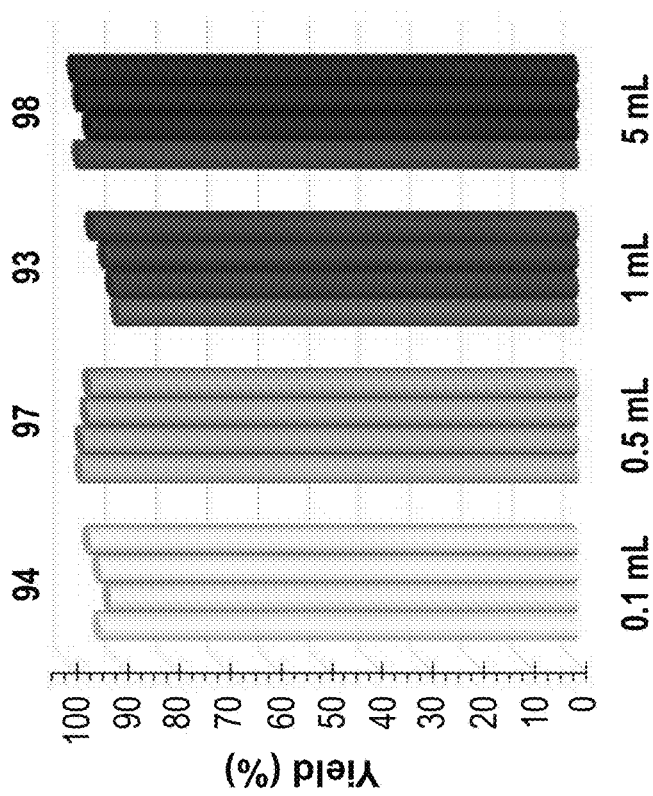
FIGS. 16A-B. Process upscaling. Assessment of process efficiency at high hIgG concentrations: 15 mg\mL (A) and 25 mg/mL (B) and indicated volumes using Tween-40 combined with the general protocol described in the Experimental section. Each column represents an independent purification trial performed on a different day. Values above each 4 of columns—represent their average.
Figure 16A:
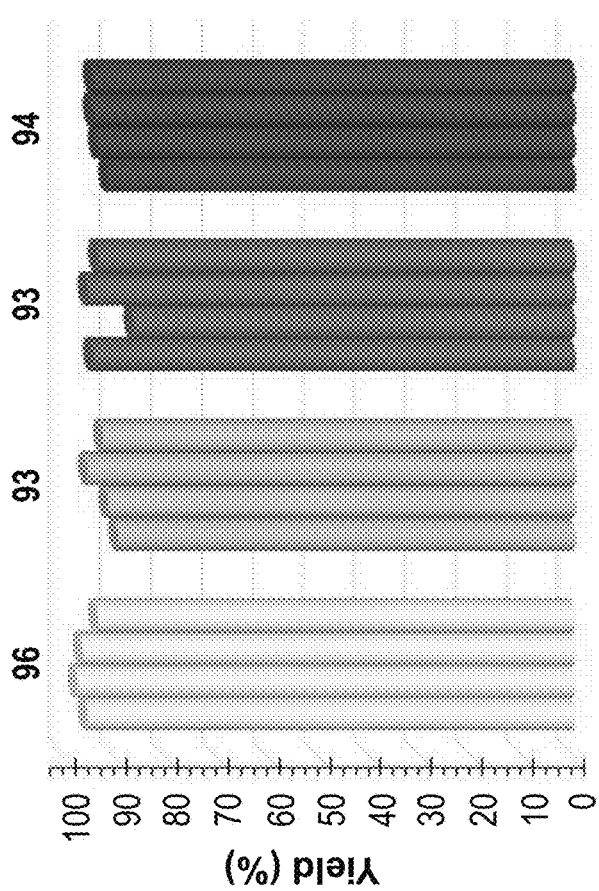

The efficiency of the method was then analyzed at larger volumes, that is at the: 0.5, 1 and 5 mL scales. The results show that process yield (and purity, not shown) are not affected even when the volume was increased by 50 folds. Under these conditions, high yields were repeatedly obtained (FIG. 16A).

Purification trials at 25 mg\mL of hIgG were initiated. Process yields were very similar to those obtained at the 15 mg\mL (of hIgG) and these, were not affected by the process volume (FIG. 16B). The purity of the recovered antibody was not affected (not shown).

Figure 17:
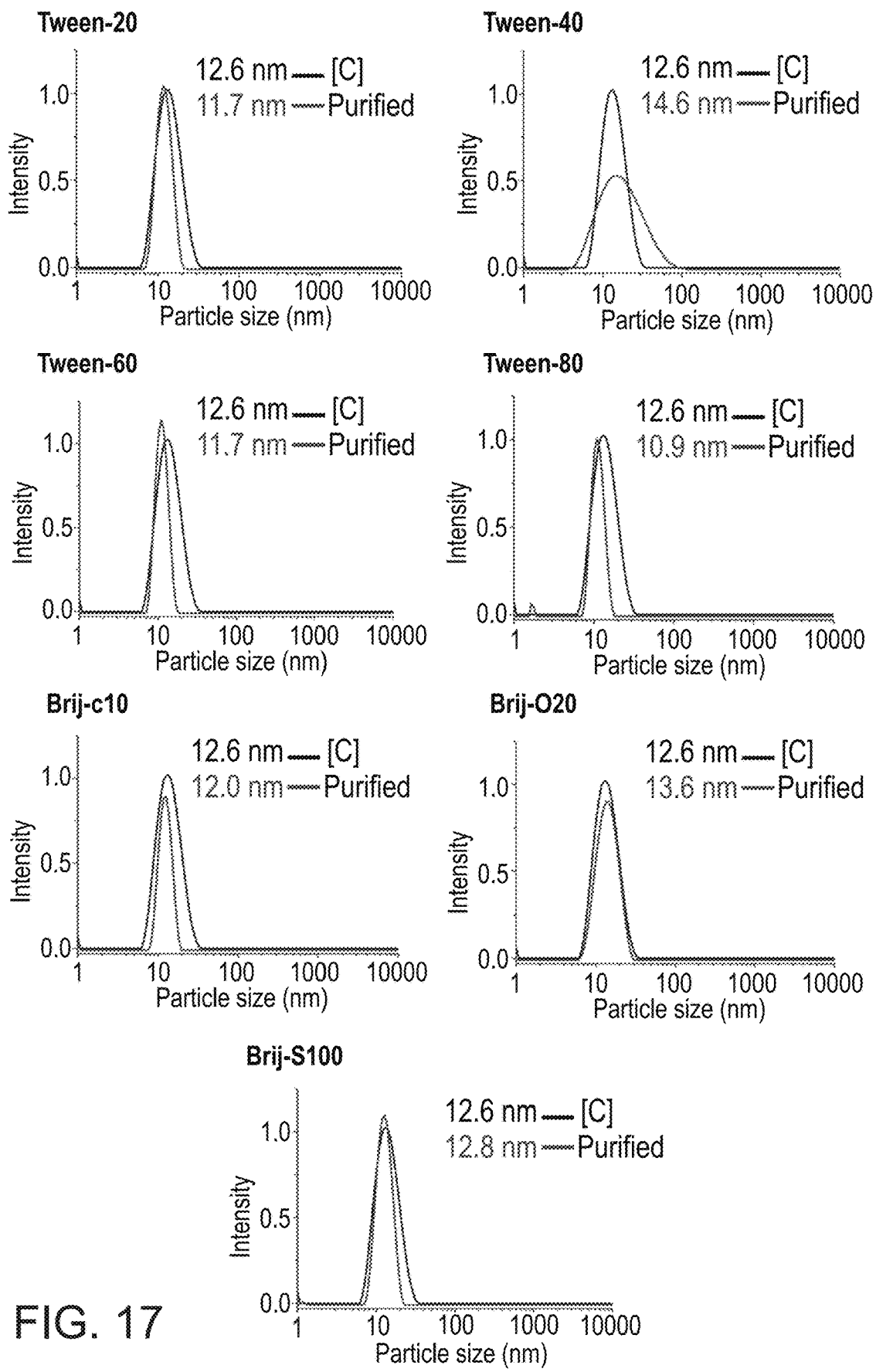
FIG. 17. Dynamic light scattering (DLS) analysis of recovered hIgG at 25 mg\mL. Particle size distribution of commercial (95% purity) hIgG, [C] that never encountered conjugated Brij-O20 micelles (black lines), as determined by dynamic light scattering at 25° C., and the particle size distribution of hIgG extracted from detergent micelle conjugates at pH 6.5 in the presence of indicated non-ionic detergent and diluted with 50 mM NaCl to 1 mg\mL hIgG (blue lines).
Figure 18:
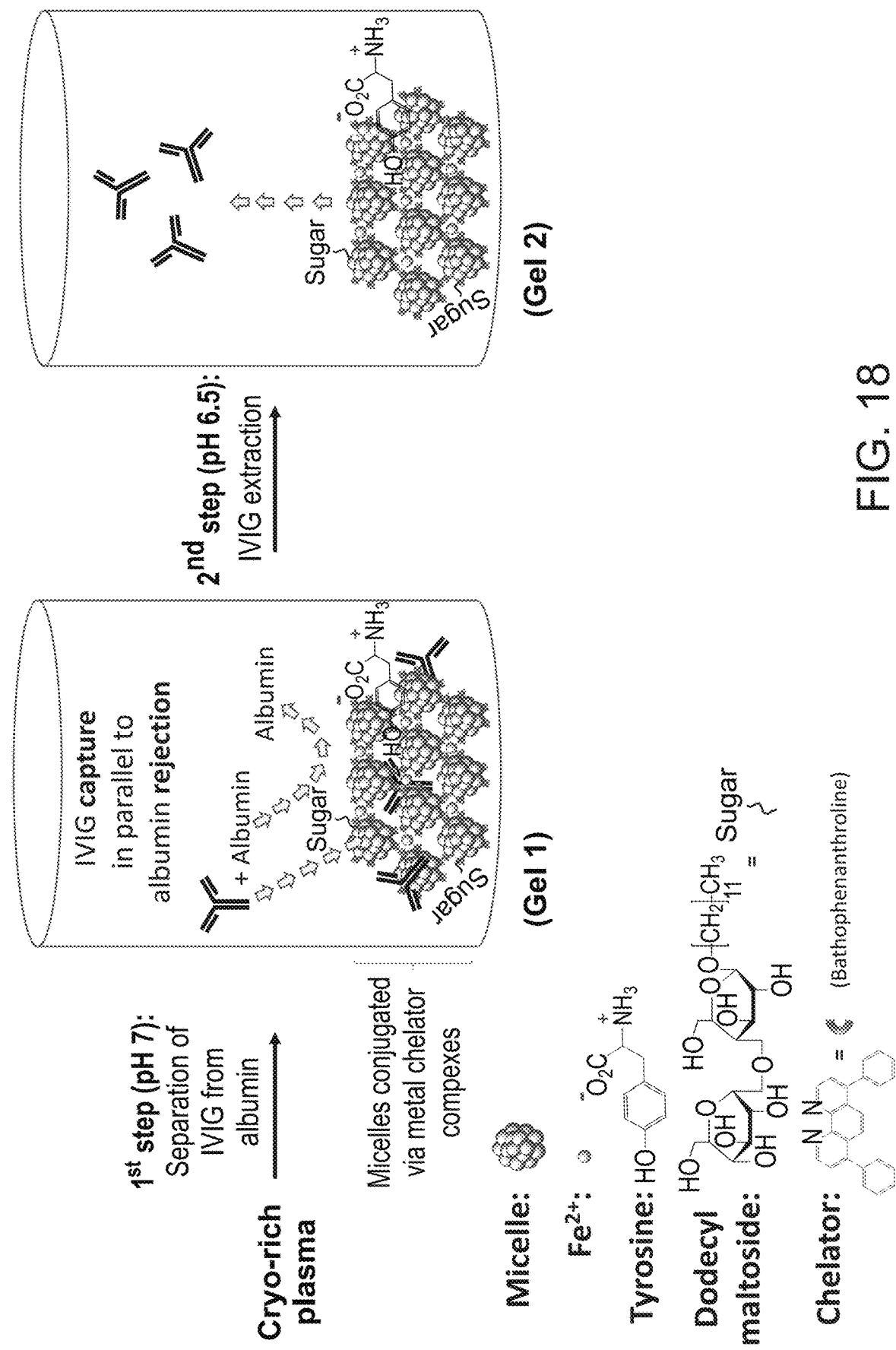
FIG. 18 is an illustration of the isolation experiment carried out on cryo-rich plasma. Results are presented in FIGS. 19A-B.

Dynamic light scattering (DLS) analysis was used to assess homogeneity in purified hIgG samples (FIG. 17). Thus, hIgG was subjected to purification with each of the 7 studied non-ionic detergents and samples deriving from the extraction step were analyzed by DLS. In all cases, the monomeric hIgG was observed regardless of the detergent used (FIG. 17). All DLS measurements were performed at 1 mg\mL hIgG and 50 mM NaCl since at >10 mg\mL of hIgG (in 400 mM NaPi, pH 6.5) control hIgG showed two particle populations at ~12-14 nm and at ~80 nm.

It can therefore be concluded, that no dimerization, oligomerization or aggregation of any type seems to occur during hIgG purification even when the immunoglobulin concentration is very high (i.e., 25 mg\ml).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of isolating an antibody, the method comprising contacting an aggregate comprising a hydrophobic chelator, at least one non-ionic detergent, metal ions and an amino acid with a liquid sample comprising the antibody under conditions that allow partitioning of the antibody into said aggregate, wherein:
   said hydrophobic chelator is bathophenanthroline;
   said non-ionic detergent being a polysorbate, a polyoxyethylene oleyl ether or octylphenol ethoxylate;
   said metal ions are iron ions; and
   said amino acid is selected from the group consisting of Phenylalanine (Phe), Tyrosine (Tyr), Tryptophan (Trp), Isoleucine (Ile) and Valine (Val),
   thereby isolating the antibody.

2. The method of claim 1 comprising generating the aggregate prior to said contacting, wherein said generating comprises combining said hydrophobic chelator, said non-ionic detergent, a metal salt of said metal ions and said amino acid.

3. The method of claim 2, further comprising solubilizing said hydrophobic chelator in a non-volatile, water-miscible organic solvent to generate a solution of said hydrophic chelator prior to said combining.

4. The method of claim 3, wherein said non-volatile, water-miscible organic solvent is DMSO or DMS.

5. The method of claim 1, wherein said liquid sample comprises a hybridoma medium.

6. The method of claim 1, wherein said liquid sample comprises serum albumin.

7. The method of claim 1, wherein said conditions comprise having a level of salt below 100 mM.

8. The method of claim 1, further comprising solubilizing said antibody following said isolating.

9. The method of claim 8, wherein said solubilizing is effected with a buffer having a pH between 3-6, wherein said buffer is a carboxylic buffer.

10. The method of claim 9, wherein said carboxylic buffer is selected from the group consisting of isoleucine, valine, glycine and sodium acetate.

11. The method of claim 1, wherein said iron ions are comprised in iron chloride, iron bromide or iron fluoride.

12. The method of claim 1, wherein said aggregate further comprises octyl glucoside (OG), dodecyl maltoside (DDM) or decyl amine.

* * * * *